(12) United States Patent
Hirose et al.

(10) Patent No.: US 8,463,630 B2
(45) Date of Patent: *Jun. 11, 2013

(54) SYSTEMS AND METHODS FOR QUEUING ACCESS TO NETWORK RESOURCES

(75) Inventors: Shigeki Hirose, Sammamish, WA (US); Dennis Denker, Scottsdale, AZ (US); Adam Sussman, Los Angeles, CA (US); Craig McLane, South Pasadena, CA (US); Sean Moriarty, Pasadena, CA (US)

(73) Assignee: Ticketmaster, L.L.C., West Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/312,611

(22) Filed: Dec. 6, 2011

(65) Prior Publication Data

US 2012/0078668 A1 Mar. 29, 2012

Related U.S. Application Data

(62) Division of application No. 11/014,436, filed on Dec. 16, 2004, now Pat. No. 8,078,483.

(60) Provisional application No. 60/530,425, filed on Dec. 16, 2003.

(51) Int. Cl.
*G06Q 10/00* (2012.01)

(52) U.S. Cl.
USPC .......................................................... 705/5

(58) Field of Classification Search
USPC ..................................................... 705/1.1, 5
See application file for complete search history.

(56) References Cited

U.S. PATENT DOCUMENTS

| 3,581,072 A | 5/1971 | Nymeyer |
| 3,622,995 A | 11/1971 | Dilks |
| 4,412,287 A | 10/1983 | Braddock, III |
| 4,603,232 A | 7/1986 | Kurland et al. |
| 4,788,643 A | 11/1988 | Trippe et al. |

(Continued)

FOREIGN PATENT DOCUMENTS

| EP | 0828223 A2 | 3/1998 |
| EP | 1069539 A2 | 1/2001 |

(Continued)

OTHER PUBLICATIONS

"Acteva and Enspot.com Sign Agreement to Provide On-Line Ticketing, Broader Distribution", Business Wire (Dec. 3, 1999).

(Continued)

*Primary Examiner* — Shannon Campbell
(74) *Attorney, Agent, or Firm* — Kilpatrick Townsend & Stockton LLP

(57) ABSTRACT

One embodiment of the present invention provides apparatus and methods for queuing access by large numbers of Internet or other network-based users to networked systems and resources with limited capacity. In one example embodiment, a queuing system provides user access to network resources, such as that of a ticketing system. A ticket queue queues a request received from a client system. A request processing module causes the client system to repeatedly transmit messages to the system during a first period, and in response to determining that the client system has ceased transmitting messages during the first period, the request is remove from the queue and/or cause the request goes unfulfilled.

24 Claims, 12 Drawing Sheets

U.S. PATENT DOCUMENTS

| | | |
|---|---|---|
| 4,789,928 A | 12/1988 | Fujisaki |
| 4,799,156 A | 1/1989 | Shavit et al. |
| 4,816,904 A | 3/1989 | McKenna et al. |
| 4,845,739 A | 7/1989 | Katz |
| 4,862,357 A | 8/1989 | Ahlstrom et al. |
| 4,889,280 A | 12/1989 | Gradl et al. |
| 4,980,826 A | 12/1990 | Wagner |
| 5,077,665 A | 12/1991 | Silverman et al. |
| 5,101,353 A | 3/1992 | Lupien et al. |
| 5,112,050 A | 5/1992 | Koza et al. |
| 5,136,501 A | 8/1992 | Silverman et al. |
| 5,181,786 A | 1/1993 | Hujink |
| 5,237,499 A | 8/1993 | Garback |
| 5,239,480 A | 8/1993 | Huegel |
| 5,253,165 A | 10/1993 | Leiseca et al. |
| 5,265,916 A | 11/1993 | Coe |
| 5,283,734 A | 2/1994 | Von Kohorn |
| 5,311,425 A | 5/1994 | Inada |
| 5,329,589 A | 7/1994 | Fraser et al. |
| 5,333,257 A | 7/1994 | Merrill et al. |
| 5,347,306 A | 9/1994 | Nitta |
| 5,408,417 A | 4/1995 | Wilder |
| 5,422,809 A | 6/1995 | Griffin et al. |
| 5,426,281 A | 6/1995 | Abecassis |
| 5,428,778 A | 6/1995 | Brookes |
| 5,475,585 A | 12/1995 | Bush |
| 5,489,096 A | 2/1996 | Aron |
| 5,496,991 A | 3/1996 | Delfer et al. |
| 5,518,239 A | 5/1996 | Johnston |
| 5,553,145 A | 9/1996 | Micali |
| 5,557,518 A | 9/1996 | Rosen |
| 5,559,707 A | 9/1996 | DeLorme et al. |
| 5,592,375 A | 1/1997 | Salmon et al. |
| 5,598,477 A | 1/1997 | Berson |
| 5,664,115 A | 9/1997 | Fraser |
| 5,684,801 A | 11/1997 | Amitay et al. |
| 5,724,520 A | 3/1998 | Goheen |
| 5,742,763 A | 4/1998 | Jones |
| 5,754,654 A | 5/1998 | Hiroya et al. |
| 5,757,917 A | 5/1998 | Rose et al. |
| 5,774,873 A | 6/1998 | Berent et al. |
| 5,794,207 A | 8/1998 | Walker et al. |
| 5,794,210 A | 8/1998 | Goldhaber et al. |
| 5,794,219 A | 8/1998 | Brown |
| 5,797,126 A | 8/1998 | Helbling et al. |
| 5,812,670 A | 9/1998 | Micali |
| 5,818,914 A | 10/1998 | Fujisaki |
| 5,826,241 A | 10/1998 | Stein et al. |
| 5,835,896 A | 11/1998 | Fisher et al. |
| 5,845,266 A | 12/1998 | Lupien et al. |
| 5,850,442 A | 12/1998 | Muftic |
| 5,890,138 A | 3/1999 | Godin et al. |
| 5,918,209 A | 6/1999 | Campbell et al. |
| 5,930,761 A | 7/1999 | O'Toole |
| 6,023,685 A | 2/2000 | Brett et al. |
| 6,023,686 A | 2/2000 | Brown |
| 6,026,383 A | 2/2000 | Ausubel |
| 6,044,363 A | 3/2000 | Mori et al. |
| 6,047,264 A | 4/2000 | Fisher et al. |
| 6,048,271 A | 4/2000 | Barcelou |
| 6,067,532 A | 5/2000 | Gebb |
| 6,070,146 A | 5/2000 | Mimata |
| 6,082,620 A | 7/2000 | Bone, Jr. |
| 6,085,164 A | 7/2000 | Smith et al. |
| 6,085,169 A | 7/2000 | Walker et al. |
| 6,085,976 A | 7/2000 | Sehr |
| 6,094,640 A | 7/2000 | Goheen |
| 6,107,932 A | 8/2000 | Walker et al. |
| 6,119,096 A | 9/2000 | Mann et al. |
| 6,119,945 A | 9/2000 | Muller et al. |
| 6,175,922 B1 | 1/2001 | Wang et al. |
| 6,192,349 B1 | 2/2001 | Husemann et al. |
| 6,216,227 B1 | 4/2001 | Goldstein et al. |
| 6,223,166 B1 | 4/2001 | Kay |
| 6,230,146 B1 | 5/2001 | Alaia et al. |
| 6,240,396 B1 | 5/2001 | Walker et al. |
| 6,243,691 B1 | 6/2001 | Fisher et al. |
| 6,246,996 B1 | 6/2001 | Stein et al. |
| 6,308,159 B1 | 10/2001 | Strohl |
| 6,341,353 B1 | 1/2002 | Herman et al. |
| 6,401,147 B1 | 6/2002 | Sang et al. |
| 6,418,415 B1 | 7/2002 | Walker et al. |
| 6,434,398 B1 | 8/2002 | Inselberg |
| 6,442,165 B1 | 8/2002 | Sitaraman et al. |
| 6,446,045 B1 | 9/2002 | Stone et al. |
| 6,449,346 B1 | 9/2002 | Katz |
| 6,466,917 B1 | 10/2002 | Goyal et al. |
| 6,470,451 B1 | 10/2002 | Weinstein |
| 6,477,503 B1 | 11/2002 | Mankes |
| 6,484,153 B1 | 11/2002 | Walker et al. |
| 6,496,809 B1 | 12/2002 | Nakfoor |
| 6,523,037 B1 | 2/2003 | Monahan et al. |
| 6,603,568 B1 | 8/2003 | Sansone |
| 6,604,107 B1 | 8/2003 | Wang |
| 6,606,661 B1 | 8/2003 | Agrawal et al. |
| 6,658,390 B1 | 12/2003 | Walker et al. |
| 6,662,230 B1 | 12/2003 | Eichstaedt et al. |
| 6,679,421 B2 | 1/2004 | Shin et al. |
| 6,685,093 B2 | 2/2004 | Challa et al. |
| 6,690,794 B1 | 2/2004 | Terao et al. |
| 6,704,489 B1 | 3/2004 | Kurauchi et al. |
| 6,704,713 B1 | 3/2004 | Brett et al. |
| 6,736,322 B2 | 5/2004 | Gobburu et al. |
| 6,782,535 B1 | 8/2004 | Dal-Santo et al. |
| 6,820,201 B1 | 11/2004 | Lincoln et al. |
| 6,829,644 B2 | 12/2004 | Aufderheide |
| 6,832,255 B1 | 12/2004 | Rumsewicz et al. |
| 6,842,741 B1 | 1/2005 | Fujimura |
| 6,845,361 B1 | 1/2005 | Dowling |
| 6,850,984 B1 | 2/2005 | Kalkunte et al. |
| 6,853,642 B1 | 2/2005 | Sitaraman et al. |
| 6,854,651 B2 | 2/2005 | Smith et al. |
| 6,859,783 B2 | 2/2005 | Cogger et al. |
| 6,876,974 B1 | 4/2005 | Marsh et al. |
| 6,877,661 B2 | 4/2005 | Webb et al. |
| 6,877,665 B2 | 4/2005 | Challa et al. |
| 6,898,472 B2 | 5/2005 | Crampton et al. |
| 6,901,429 B2 | 5/2005 | Dowling |
| 6,907,405 B2 | 6/2005 | Brett |
| 6,910,019 B2 | 6/2005 | Dorr |
| 6,910,627 B1 | 6/2005 | Simpson-Young et al. |
| 6,920,428 B2 | 7/2005 | Greene |
| 6,944,599 B1 | 9/2005 | Vogel et al. |
| 6,963,854 B1 | 11/2005 | Boyd et al. |
| 6,965,914 B2 | 11/2005 | Dowling |
| 6,973,176 B1 | 12/2005 | Chism et al. |
| 6,999,936 B2 | 2/2006 | Sehr |
| 7,003,485 B1 | 2/2006 | Young |
| 7,004,388 B2 | 2/2006 | Kohita |
| 7,010,494 B2 | 3/2006 | Etzioni et al. |
| 7,031,945 B1 | 4/2006 | Donner |
| 7,044,362 B2 | 5/2006 | Yu |
| 7,058,602 B1 | 6/2006 | La Mura et al. |
| 7,069,243 B2 | 6/2006 | Dinwoodie |
| 7,076,460 B2 | 7/2006 | Dinwoodie |
| 7,080,026 B2 | 7/2006 | Singh et al. |
| 7,080,030 B2 | 7/2006 | Eglen et al. |
| 7,080,328 B1 | 7/2006 | Sawyer |
| 7,080,882 B2 | 7/2006 | Stitt |
| 7,083,081 B2 | 8/2006 | McGee et al. |
| 7,085,818 B2 | 8/2006 | Brown et al. |
| 7,092,892 B1 | 8/2006 | Sobalvarro et al. |
| 7,093,130 B1 | 8/2006 | Kobayashi et al. |
| 7,099,841 B1 | 8/2006 | Hall et al. |
| 7,110,960 B2 | 9/2006 | Phillips et al. |
| 7,114,179 B1 | 9/2006 | Ritter et al. |
| 7,124,062 B2 | 10/2006 | Gebhart |
| 7,127,404 B1 | 10/2006 | Poon |
| 7,127,408 B2 | 10/2006 | Rosen |
| 7,133,848 B2 | 11/2006 | Phillips et al. |
| 7,139,916 B2 | 11/2006 | Billingsley et al. |
| 7,149,549 B1 | 12/2006 | Ortiz et al. |
| 7,152,043 B2 | 12/2006 | Alaia et al. |
| 7,162,454 B1 | 1/2007 | Donner et al. |
| 7,191,147 B2 | 3/2007 | Heene et al. |
| 7,225,442 B2 | 5/2007 | Dutta et al. |
| 7,333,943 B1 | 2/2008 | Charuk et al. |

| | | | |
|---|---|---|---|
| RE43,157 E | 2/2012 | Bishop et al. | |
| 2001/0034687 A1 | 10/2001 | Bushonville et al. | |
| 2001/0049652 A1 | 12/2001 | Nakajima | |
| 2002/0004762 A1 | 1/2002 | Izumoto | |
| 2002/0023955 A1 | 2/2002 | Frank et al. | |
| 2002/0040308 A1 | 4/2002 | Hasegawa et al. | |
| 2002/0040346 A1 | 4/2002 | Kwan | |
| 2002/0042729 A1 | 4/2002 | Yajima et al. | |
| 2002/0052758 A1 | 5/2002 | Arthur et al. | |
| 2002/0052965 A1 | 5/2002 | Dowling | |
| 2002/0062265 A1 | 5/2002 | Poon | |
| 2002/0065763 A1 | 5/2002 | Taylor et al. | |
| 2002/0065783 A1 | 5/2002 | Na et al. | |
| 2002/0082879 A1 | 6/2002 | Miller et al. | |
| 2002/0082969 A1 | 6/2002 | O'Keefe et al. | |
| 2002/0087366 A1 | 7/2002 | Collier et al. | |
| 2002/0087456 A1 | 7/2002 | Abeshouse et al. | |
| 2002/0091555 A1 | 7/2002 | Leppink | |
| 2002/0094090 A1 | 7/2002 | Lino | |
| 2002/0095357 A1 | 7/2002 | Hunter et al. | |
| 2002/0099831 A1 | 7/2002 | Tsunogai | |
| 2002/0103849 A1 | 8/2002 | Smith | |
| 2002/0107779 A1 | 8/2002 | Maltzman | |
| 2002/0116343 A1 | 8/2002 | Nakamura et al. | |
| 2002/0128922 A1 | 9/2002 | Joao | |
| 2002/0138325 A1 | 9/2002 | Mashimo et al. | |
| 2002/0138751 A1 | 9/2002 | Dutta | |
| 2002/0138770 A1 | 9/2002 | Dutta | |
| 2002/0143860 A1 | 10/2002 | Catan | |
| 2002/0156715 A1 | 10/2002 | Wall et al. | |
| 2002/0169623 A1 | 11/2002 | Call et al. | |
| 2002/0178093 A1 | 11/2002 | Dean et al. | |
| 2002/0178226 A1 | 11/2002 | Anderson et al. | |
| 2002/0188523 A1 | 12/2002 | Hyyppa et al. | |
| 2002/0188551 A1 | 12/2002 | Grove et al. | |
| 2003/0007627 A1 | 1/2003 | Elsey et al. | |
| 2003/0023500 A1 | 1/2003 | Boies et al. | |
| 2003/0024988 A1 | 2/2003 | Stanard | |
| 2003/0040943 A1 | 2/2003 | Bates et al. | |
| 2003/0061303 A1 | 3/2003 | Brown et al. | |
| 2003/0067464 A1 | 4/2003 | Gathman et al. | |
| 2003/0069762 A1 | 4/2003 | Gathman et al. | |
| 2003/0069763 A1 | 4/2003 | Gathman et al. | |
| 2003/0069764 A1 | 4/2003 | Gathman et al. | |
| 2003/0069789 A1 | 4/2003 | Gathman et al. | |
| 2003/0069810 A1 | 4/2003 | Gathman et al. | |
| 2003/0069827 A1 | 4/2003 | Gathman et al. | |
| 2003/0069829 A1 | 4/2003 | Gathman et al. | |
| 2003/0099197 A1 | 5/2003 | Yokota et al. | |
| 2003/0105641 A1 | 6/2003 | Lewis | |
| 2003/0154142 A1 | 8/2003 | Ginsburg et al. | |
| 2003/0154169 A1 | 8/2003 | Yanai | |
| 2003/0163373 A1 | 8/2003 | Cornateanu | |
| 2003/0164400 A1 | 9/2003 | Boyd | |
| 2003/0171960 A1 | 9/2003 | Skinner | |
| 2003/0177022 A1 | 9/2003 | Francis | |
| 2003/0187802 A1 | 10/2003 | Booth | |
| 2003/0208392 A1 | 11/2003 | Shekar et al. | |
| 2003/0229790 A1 | 12/2003 | Russell | |
| 2003/0236736 A1 | 12/2003 | Harmon et al. | |
| 2004/0006497 A1 | 1/2004 | Nestor et al. | |
| 2004/0019571 A1 | 1/2004 | Hurwitz et al. | |
| 2004/0039635 A1 | 2/2004 | Linde et al. | |
| 2004/0039696 A1 | 2/2004 | Harmon et al. | |
| 2004/0049412 A1 | 3/2004 | Johnson | |
| 2004/0073439 A1 | 4/2004 | Shuster | |
| 2004/0083156 A1 | 4/2004 | Schulze | |
| 2004/0086257 A1 | 5/2004 | Werberg et al. | |
| 2004/0093175 A1 | 5/2004 | Tan | |
| 2004/0111303 A1 | 6/2004 | Francis | |
| 2004/0128257 A1 | 7/2004 | Okamoto et al. | |
| 2004/0128516 A1 | 7/2004 | Okamoto et al. | |
| 2004/0138962 A1 | 7/2004 | Kopelman et al. | |
| 2004/0172270 A1 | 9/2004 | Sugimoto et al. | |
| 2004/0204990 A1 | 10/2004 | Lee et al. | |
| 2004/0204991 A1 | 10/2004 | Monahan et al. | |
| 2004/0205074 A1 | 10/2004 | Berkery et al. | |
| 2004/0215527 A1 | 10/2004 | Grove et al. | |
| 2004/0220821 A1 | 11/2004 | Ericsson et al. | |
| 2005/0001711 A1 | 1/2005 | Doughty et al. | |
| 2005/0015303 A1 | 1/2005 | Dubin et al. | |
| 2005/0015308 A1 | 1/2005 | Grove et al. | |
| 2005/0021364 A1 | 1/2005 | Nakfoor | |
| 2005/0021365 A1 | 1/2005 | Nakfoor | |
| 2005/0027608 A1 | 2/2005 | Wiesmuller et al. | |
| 2005/0027641 A1 | 2/2005 | Grove et al. | |
| 2005/0065866 A1 | 3/2005 | Grove et al. | |
| 2005/0071245 A1 | 3/2005 | Norins, Jr. et al. | |
| 2005/0131809 A1 | 6/2005 | Watt, II et al. | |
| 2005/0139661 A1 | 6/2005 | Eglen et al. | |
| 2005/0139662 A1 | 6/2005 | Eglen et al. | |
| 2005/0140675 A1 | 6/2005 | Billingsley et al. | |
| 2005/0144115 A1 | 6/2005 | Brett | |
| 2005/0149458 A1 | 7/2005 | Eglen et al. | |
| 2005/0160020 A1 | 7/2005 | Asher et al. | |
| 2005/0165758 A1 | 7/2005 | Kasten et al. | |
| 2005/0209954 A1 | 9/2005 | Asher et al. | |
| 2005/0213742 A1 | 9/2005 | Fukuzawa | |
| 2005/0228722 A1 | 10/2005 | Embree | |
| 2005/0240453 A1 | 10/2005 | Lyons | |
| 2005/0273405 A1 | 12/2005 | Chen | |
| 2005/0286532 A1 | 12/2005 | Mengerink | |
| 2006/0017541 A1 | 1/2006 | Nguyen | |
| 2006/0069780 A1 | 3/2006 | Batni et al. | |
| 2006/0085396 A1 | 4/2006 | Evans et al. | |
| 2006/0095344 A1 | 5/2006 | Nakfoor | |
| 2006/0100985 A1 | 5/2006 | Mark et al. | |
| 2006/0105783 A1 | 5/2006 | Giraldin et al. | |
| 2006/0108418 A1 | 5/2006 | Rice | |
| 2006/0111967 A1 | 5/2006 | Forbes | |
| 2006/0116916 A1 | 6/2006 | Bowman et al. | |
| 2006/0124734 A1 | 6/2006 | Wallerstorfer et al. | |
| 2006/0126201 A1 | 6/2006 | Jain | |
| 2006/0140374 A1 | 6/2006 | Light et al. | |
| 2006/0143094 A1 | 6/2006 | Kohout et al. | |
| 2006/0143109 A1 | 6/2006 | Goel | |
| 2006/0143698 A1 | 6/2006 | Ohara | |
| 2006/0144946 A1 | 7/2006 | Kuriyama et al. | |
| 2006/0147005 A1 | 7/2006 | Taub | |
| 2006/0148566 A1 | 7/2006 | Lakshminarasimha | |
| 2006/0155659 A1 | 7/2006 | DiCesare | |
| 2006/0167756 A1 | 7/2006 | VonBergen et al. | |
| 2006/0178930 A1 | 8/2006 | Kim | |
| 2006/0190387 A1 | 8/2006 | Molloy | |
| 2006/0190388 A1 | 8/2006 | Molloy | |
| 2006/0190389 A1 | 8/2006 | Molloy | |
| 2006/0190390 A1 | 8/2006 | Molloy | |
| 2006/0195356 A1 | 8/2006 | Nerenhausen et al. | |
| 2006/0232110 A1 | 10/2006 | Ovadia | |
| 2006/0244564 A1 | 11/2006 | Madsen | |
| 2006/0249572 A1 | 11/2006 | Chen et al. | |
| 2006/0271462 A1 | 11/2006 | Harmon | |
| 2006/0277130 A1 | 12/2006 | Harmon | |
| 2006/0293929 A1 | 12/2006 | Wu et al. | |
| 2006/0293994 A1 | 12/2006 | Stuart | |
| 2007/0012765 A1 | 1/2007 | Trinquet et al. | |
| 2007/0017979 A1 | 1/2007 | Wu et al. | |
| 2007/0055554 A1 | 3/2007 | Sussman et al. | |
| 2008/0033770 A1* | 2/2008 | Barth et al. | 705/5 |
| 2008/0243838 A1 | 10/2008 | Scott et al. | |
| 2008/0300956 A1 | 12/2008 | Nishikawa et al. | |

FOREIGN PATENT DOCUMENTS

| | | |
|---|---|---|
| JP | 5266049 | 10/1993 |
| JP | 11031204 A | 2/1999 |
| WO | WO 88/03295 | 5/1988 |
| WO | WO 98/10361 | 3/1998 |
| WO | WO 99/06928 | 2/1999 |
| WO | WO 99/18533 | 4/1999 |
| WO | WO 99/38129 | 7/1999 |
| WO | WO 99/60489 | 11/1999 |
| WO | WO 00/62260 | 10/2000 |
| WO | WO 00/74300 A1 | 12/2000 |
| WO | WO 00/75838 A1 | 12/2000 |
| WO | WO 01/03040 A1 | 1/2001 |
| WO | WO 01/08065 A1 | 2/2001 |
| WO | WO 01/41021 A1 | 6/2001 |
| WO | WO 01/41085 A2 | 6/2001 |

| | | |
|---|---|---|
| WO | WO 01/44892 A2 | 6/2001 |
| WO | WO 01/52139 A1 | 7/2001 |
| WO | WO 01/59649 A1 | 8/2001 |
| WO | WO 01/59658 A1 | 8/2001 |
| WO | WO 01/71669 A2 | 9/2001 |
| WO | WO 01/84473 | 11/2001 |
| WO | WO 02/03171 A2 | 1/2002 |
| WO | WO 02/03174 | 1/2002 |
| WO | WO 02/35322 A2 | 5/2002 |
| WO | WO 03/027808 A2 | 4/2003 |

OTHER PUBLICATIONS

"AuctionNet Still One-Of-A-Kind", Automotive News, S12 (Sep. 20, 1993).
"Cathay Pacific Airways Auctions a Boeing 747-400 Worth of Seats in Third Cybertraveler Auction", Business Wire (Apr. 29, 1996).
"Cathay Pacific Airways—USA Receives More than 1,300 Bids During First Five Days of CyberAuction", Business Wire (Oct. 18, 1995).
"Cathay Pacific Airways—USA to Hold First-Ever Internet CyberAuction", Business Wire (Sep. 26, 1995).
"E-TicketBoard Launches PSL Xchange for Eight NFL Teams", PR Newswire (Jul. 18, 2000).
"E-TicketBoard Launches Revolutionary New Site—SeatsandSuites", PR Newswire (Oct. 17, 2000).
"Keyware Unveils Multi-Application Smart Card Suite", Card News, vol. 16, No. 10 (May 30, 2001).
"Online Movie Ticket Site Launched in China", China Online (Dec. 23, 1999).
"OnSale Brings Thrill of the Auction to the Web", Link-up p. 34 (Jul./Aug. 1995).
"Season Ticket Solutions Announces Availability of Ticket Exchange for Sporting Teams and Entertainment Venues", Business Wire (Jul. 30, 2001).
"WBGH to Hold Online Computer Auction", Link-Up, p. 10 (Sep./Oct. 1988).
Article from Smart Card News, "Major Players Form Proton World International", Aug. 1998, pp. 141-160.
Asokan, et al. "SEMPER Consortium: Advanced Services, Architecture and Design", Deliverable D10 of ACTS Project ACO26, Mar. 15, 1999.
Banâtre, "Distributed Auction Bidding System", International Computing Symposium, vol. 4, No. 4 (Aug. 1981).
Banks, "PSL Put Owners on the Hot Seat", St. Petersburg Times, p. 10C (Oct. 31, 1993).
Beam et al, "Electronic Negotiation through Internet-Based Auctions", CITM Working Paper 96-WP-1019, http://haas.berkeley.edu/citm/publications/papers/wp-1019.pdf (Dec. 1996).
Blau, "Dormitories See Departure from Previous Years' Trends", The Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Chui, et al. "Auction on the Internate—A Preliminary Study", Department of Marketing, HK Univiersity of Science and Technology; 1999, pp. 1-7.
Collier, "Columbia, S.C.—Based Internet Firm Helps Buy, Sell Sports Tickets", The State, (Oct. 23, 2000).
U.S. Appl. No. 09/702,794, filed Nov. 1, 2000.
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Fujimura, "XML Ticket: Generalized Digital Ticket Definition Language", The W3C Signed XML Workshop—Copyright © 1999, 33 pages.
Fujimura, et al. "Digital-Ticket-Controlled Digital Ticket Circulation", NTT Information Sharing Platform Laboratories, USENIX Security Symposium, Aug. 23-26, 1999.
Fujimura, et al. "General-purpose Digital Ticket Framework", NTT Information and Communication Systems Labs, USENIX Workshop on Electronic Commerce; Aug. 31-Sep. 1998.
Garza, "Space Cruise", Reason (May 2000).
Happel, "Creating a Futures Market for Major Event Tickets: Problems and Prospects", Cato Journal, vol. 21, No. 3 (Winter 2002).
Harlan, "At Least it isn't the Team's Ball that's in Somebody Else's Court", Wall Street Journal (Jun. 4, 1991).
Hes, et al. "At Face Value" On biometrical identification and privacy, Registratiekamer, Sep. 1999; 78 pages.
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
In, Shirley Siu Weng, "A Proposed Electronic Ticket Management for trading Service in Internet", Feb. 9, 2001; 7 pages.
Jackson, "Media Futures: This Bazaar Could Put Retailers Under the Hammer", Financial Times (May 25, 1995).
Jenkins, "Giants Draw Fans into Web Team Helps Season-Ticket Holders Get Mileage Out of Plans", USA Today, p. 3C (Jun. 27, 2000).
Kasper, "Purchase Griz Playoff Tickets Now", Missoulian Online (May 3, 2001).
Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Matsuyama, et al. "Distributed Digital-Ticket Management for Rights Trading System", E-Commerce, 1999; pp. 110-118.
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.uni-mannheim.de/publications/dp99-75.pdf (Jul. 14, 1999).
Nestor et al, "Transforming Tickets from a Commodity into a Valuable Strategic Asset", Global eTicket Exchange whitepaper, Oct. 13, 2000.
Office Action mailed on Aug. 2, 2007 in U.S. Appl. No. 11/453,286.
Office Action mailed on Jul. 27, 2007 in U.S. Appl. No. 11/475,733.
O'Neil, "Q and A", St. Louis Post-Dispatch, p. 4D (Jan. 19, 1995).
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
www.TicketOptions.com Web Pages, as retreived from archive.org (2001).
wwwSeasonTicket.com Web Pages, as retreived from archive.org (2001).
Zoltak, "Advantix Acquisitions Continue with Protix Deal", Amusement Business (Nov. 2, 1998).

* cited by examiner

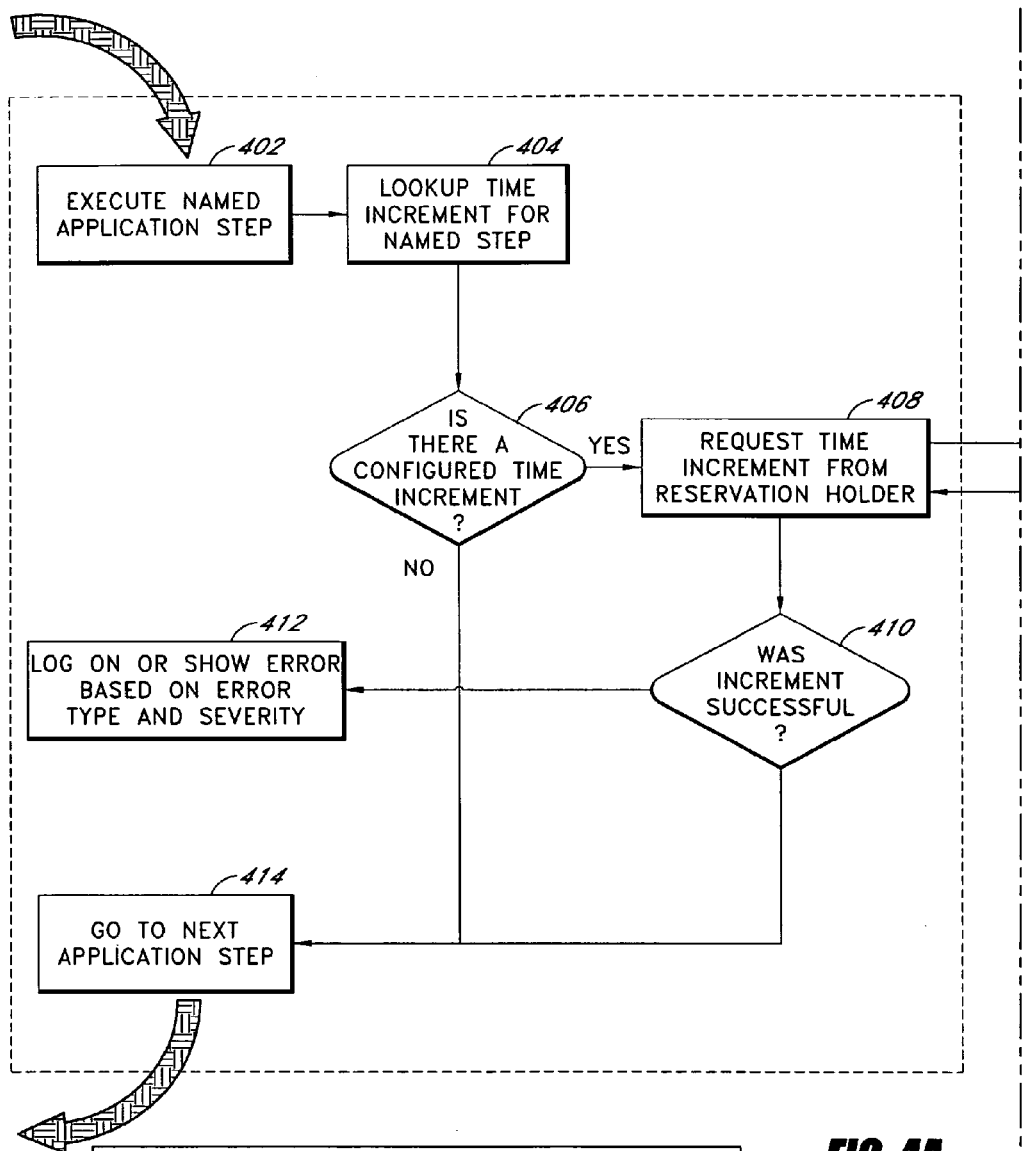

FIG. 6A ticketmaster

1. shipping    2. billing    3. confirmation

You have 1:45 minutes to complete this page.
After 1:45 minutes these tickets will be released.

event

Hapa-Celebration of Hawaii
Irvine Barclay Theater, Irvine CA
Sat. Feb 14, 2004 5:00pm
your ticket(s)

| Section | Row | Type | Ticket Price | Building Facility Charge | Convenience Charge | Description |
|---------|-----|------|--------------|--------------------------|--------------------|--------------|
| ORCH | P | FULL PRICE TICKET | $38.00 | $0.00 | $6.75 | PRICE LEVEL 1 |
| ORCH | P | FULL PRICE TICKET | $38.00 | $0.00 | $6.75 | LOWER LEVEL ORCHESTRA |

Seats: 107 to 108 | seating chart

If you don't want these tickets give them up an search again.

A processing fee per order is applied to the delivery prices per order listed below.
Select Price Per Order    Delivery Method
US Customers
○ $18.50    Ups Delivery (by 5:00 pm in 2 business days-undeliverable to PO Box addresses)
○ $25.00    UPS Saturday Delivery (by noon on Sataurdy. Order must be placeced by Wednsday prior-undeliverable to PO Box address)
○ No additional charge    Standard Mail (Your tickets will be mailed to your billing address and delivered no later than 48 hours before the event in a plain unmarked envelope.)

Customers in Canada
○ No additional charge    Canadian Standard Mail (Your tickets will be mailed to your billing address and delivered no later than 48 hours before the event in a plain unmarked white envelope.)

FIG. 6B ticketmaster

You have 1:30 minutes to complete this page.
After 1:30 minutes these tickets will be released.

create account

File name

Email address

Retype Email address

Zip/Postal code

Type password     1-12 characters

Retype password

As a registered user of Ticketmaster.com, you are subject to the terms of use which, among other things, prohibits commercial use of this site.

Accept and Continue

Already have an account? Sign In

FIG. 6C ticketmaster

1. shipping | 2. billing | 3. confirmation

You have 1:30 minutes to complete this page.
After 1:30 minutes these tickets will be released.

event
Hapa-Celebration of Hawaii
Irvine Barclay Theater, Irvine, CA
Sat. Feb14, 2004 5:00pm
revise your order

| Item | Charge |
|---|---|
| Tickets (Hapa-Celebration of Hawaii) | $36.00 x 2 |
| FULL PRICE TICKET | $13.50 |
| Total Convenience Charge(s) | |
| Total Taxes | $0.00 |
| Order Processing Charge(s) | $0.75 |
| Standard Mail | $0.00 |
| TOTAL CHARGES | $93.25 | enter billing address
Your order may be cancelled without notice if you do not use the exact billing address of your credit card.
Age Restrictions
If you are under 18 years old you cannot provide us with any information about yourself.
If you fill in this form, you represent that you are at least 18 years old.
Shipping and billing Restrictions
Tickets are shipped to your billing address only. UPS orders cannot be shipped to P.O. Boxes.

(your tickets will be shipped to this address)

Required Fields
Enter the credit card billing address and name exactly as it appears on your credit card statement.
Required Fields
First Name*

SYSTEMS AND METHODS FOR QUEUING ACCESS TO NETWORK RESOURCES

PRIORITY CLAIM

This application is a divisional of U.S. patent Ser. No. 11/014,436, filed Dec. 16, 2004, which claims the benefit under 35 U.S.C. 119(e) of U.S. Provisional Application No. 60/530,425, filed Dec. 16, 2003, the content of which is incorporated herein in its entirety.

RELATED APPLICATION

This application is related to copending application, entitled SYSTEMS AND METHODS FOR QUEUING REQUESTS AND PROVIDING QUEUE STATUS, Ser. No. 11/014,269, filed on Dec. 16, 2004, the entirety of which is hereby incorporated by reference.

COPYRIGHT RIGHTS

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is related to queuing, and in particular, to apparatus and processes for queuing access to network resources.

2. Description of the Related Art

Many online processes involve large numbers of users attempting to access networked systems and resources with limited capacity. For example, with respect to online auctions, there may be a limited number of items, such as tickets, being auctioned, and a large number of users that want to bid for such items at about the same time or within a short period of time. In many conventional systems, when such a situation occurs, the system may not be able to process all user requests, and so many users may be provided with an error message informing them that system access is not currently available and instructing users to attempt to access the system at a later time. This can cause user frustration and discourage many users from further attempting to access the system.

In addition, with some conventional systems, when large numbers of users attempt to access the system at about the same time, the system may disadvantageously fail to provide orderly or fair access to the system resources.

SUMMARY OF THE INVENTION

One embodiment of the present invention provides apparatus and methods for queuing access by large numbers of Internet or other network-based users to networked systems and resources with limited capacity, such as, by way of example, situations where demand far exceeds resources.

In one example embodiment, a queuing process provides user access to network resources, such as those involved in ticket transactions, in a fair, systematic, and deterministic manner while maintaining transaction state information with the detection of implicit or explicit abandonment of user places in the queue.

Advantageously, inordinate processing resources are not expended on the maintenance of user connections to the system prior to being serviced by the limited system resource. Additionally, in order to allow a wide variety of user clients or terminal-types, including those with limited processor power, to access a server-based system, functionality on the user side is optionally kept simple. By way of example, the user terminal can be a computing device executing a browser, such as a browser-equipped personal digital assistant, cell phone, interactive television, or personal computer.

To further ensure equitable access to the limited system resources, the queue is preferably resistant to tampering such that a user's position in the queue is controlled by the server side, rather than the client or user terminal side. Preferably, the system recovers from server-side failures substantially transparently to end-users.

One example embodiment provides a method of queuing ticketing requests using a ticketing computer system, the method comprising: receiving at a ticketing computer system an electronic request for a ticket transmitted from a user browser; queuing the request within the ticketing computer system; transmitting an instruction from the ticketing computer system to the browser, the instruction causing the browser to transmit messages at a periodic rate to the ticketing computer system during a first period; determining if the browser has ceased transmitting messages for at least a first duration during the first period; determining if the browser is transmitting messages at greater than a first frequency during the first period; in response to determining that the browser has ceased transmitting messages during the first period or that the browser is transmitting messages at greater than a first frequency during the first period, determining that the request is not to be fulfilled; and responding to the request when the browser has not ceased transmitting messages during the first period and is not transmitting messages at greater than a first frequency during the first period.

Another example embodiment provides a ticket system that queues ticket requests, the system comprising: a ticket queue in computer readable memory that queues a ticketing request received from a client system prior to fulfilling the ticketing request; and a ticketing request processing module stored in computer readable memory configured to cause the client system to repeatedly transmit messages to the ticket system during a first period, and in response to determining that the client system has ceased transmitting messages during the first period, to remove the ticketing request from the ticket queue and/or cause the ticketing request to go unfulfilled.

Still another example embodiment provides an electronic ticketing management method, the comprising: receiving at a computer ticketing system a ticketing request from a networked first request source; determining if a number of ticket-related communications from the first request source exceeds a first amount in a first window of time; and at least partly in response to determining that the number of ticket-related communications from the first request source exceeds the first amount in the first window of time, preventing at least one ticket related request from the first request source from being serviced.

One example embodiment provides an electronic ticketing management method, comprising: rendering a ticketing Web page form for display to a user; determining if the user has a ticket in a reserved state by accessing information stored in computer readable memory; retrieving from computer readable memory a value related to an amount of time the user has to complete the Web page form before expiration of the ticket reservation; electronically determining if the ticket reservation has expired at least partly as a result of the user failing to timely complete the Web page form; and after determining that the ticket reservation has expired, causing a reservation expiration notice to be presented to the user.

Another example embodiment provides a method of queuing requests using a computer system, the method comprising: receiving at a computer system an electronic request transmitted for a resource from a client computer associated with a user; electronically queuing the request; transmitting an instruction from the computer system to the client system, the instruction intended to cause the client system to transmit messages to the computer system during a first period at a first rate; determining if the client system has ceased transmitting the messages for at least a first duration during the first period; at least partly in response to determining that the client system has ceased transmitting messages during the first period, determining that the request is not to be fulfilled, and based at least in part on determining that the client system has not ceased transmitting messages during the first period, responding to the request.

BRIEF DESCRIPTION OF THE DRAWINGS

FIGS. 4A-B illustrate an example adjustment process of a reservation timer.

FIGS. 6A-6E illustrate example user interfaces for a ticket purchase process.

DETAILED DESCRIPTION OF PREFERRED EMBODIMENTS

Figure 1:
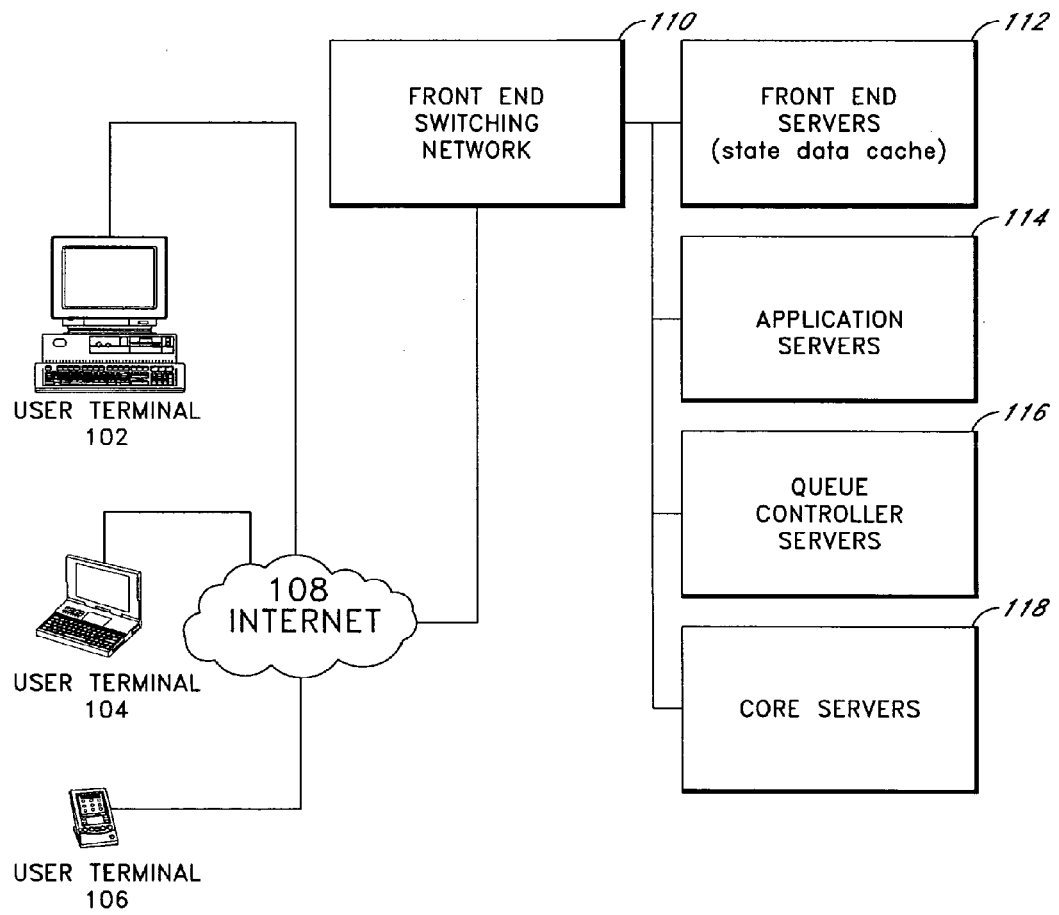
FIG. 1 illustrates an example networked computer system that can be used in accordance with an example embodiment of the present invention.

Throughout the following description, the term "Web site" is used to refer to a user-accessible server site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

In addition, unless otherwise indicated, the functions described herein are preferably performed by executable code and instructions running on one or more general-purpose computers, terminals, personal digital assistants, cellular phones, or the like. However, the present invention can also be implemented using special purpose computers, state machines, and/or hardwired electronic circuits. The example processes described herein do not necessarily have to be performed in the described sequence, and not all states have to be reached or performed.

Embodiments of the present invention can be used with numerous different operating systems, including by way of example and not limitation, Microsoft's Windows operating systems, Sun's Solaris operating systems, Linux operating systems, Unix operating systems, Apple OS X or other Apple operating systems, as well as other operating systems.

Further, while the following description may refer to "clicking on" a link or button, or pressing a key in order to provide a command or make a selection, the commands or selections can also be made using other input techniques, such as using voice input, pen input, mousing or hovering over an input area, and/or the like.

As will be described below, in an example embodiment, a transaction includes a user request transmitted via a browser over a network to access certain computer-controlled resources. By way of example and not limitation, the resources can be associated with tickets or with handling ticket transactions, such as the sale or transfer of tickets. A ticket, for example, can represent the right to utilize a reserved or general admission seat at an entertainment/sports venue, on an airplane or other mode of transportation, and so on.

The resources can also be associated with other types of transactions, such as, by way of example and not limitation, product sale transactions, information request transactions, and so on. The user request is queued until the request can be serviced by the responding system. By way of example, the queue time can depend on the number of requests, the load on the responding system, complexity/processing time of each request, and/or the duration of time such resource is used/reserved by each request. By way of example, a request can relate to selecting and/or paying for seats for an event. The system can hold or reserve the selected seats for a specified period of time and/or until the user completes a specified task, such as entering payment information for the tickets, and/or approving the ticket purchase.

Figure 6D:
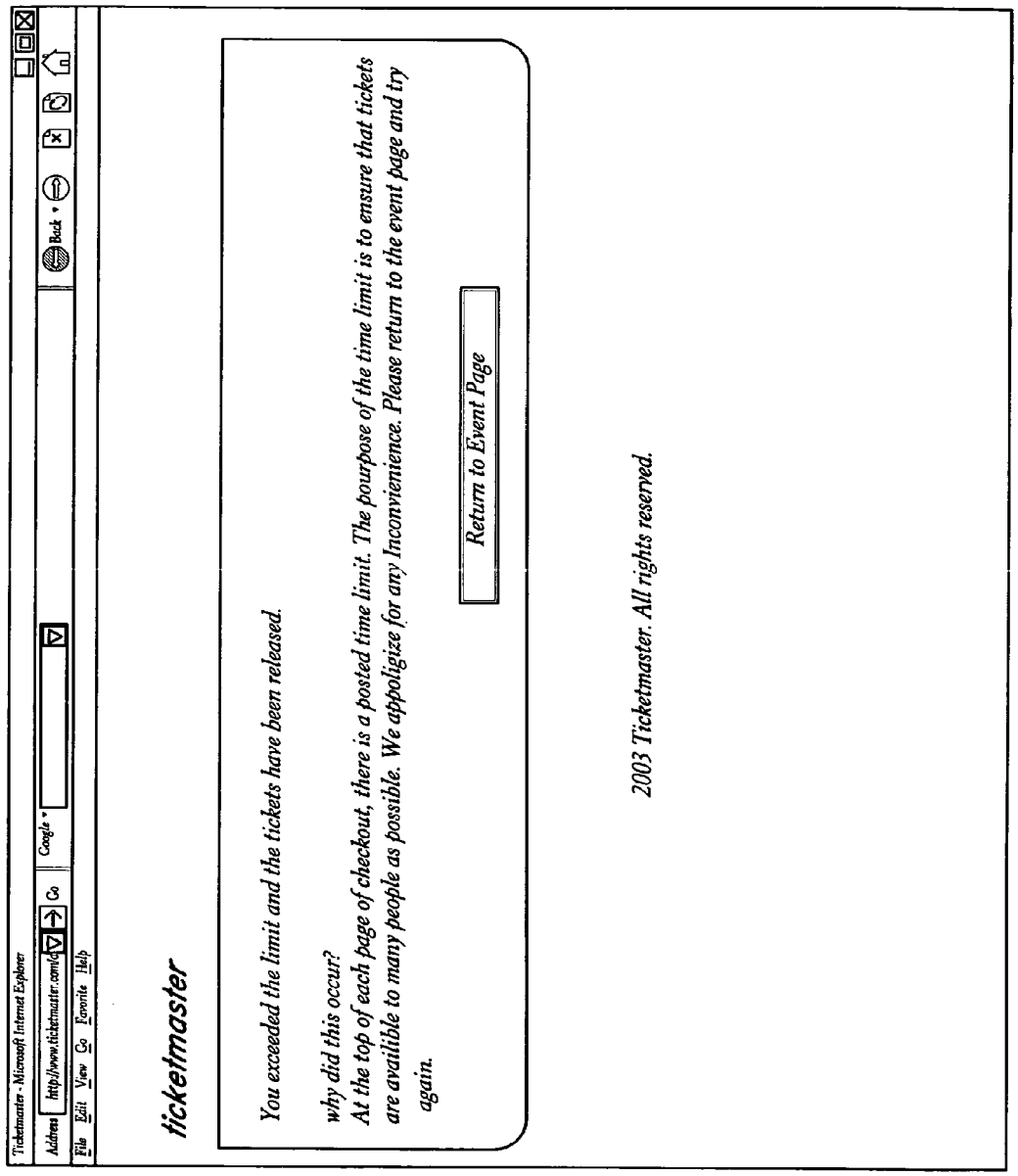
Figure 6E:
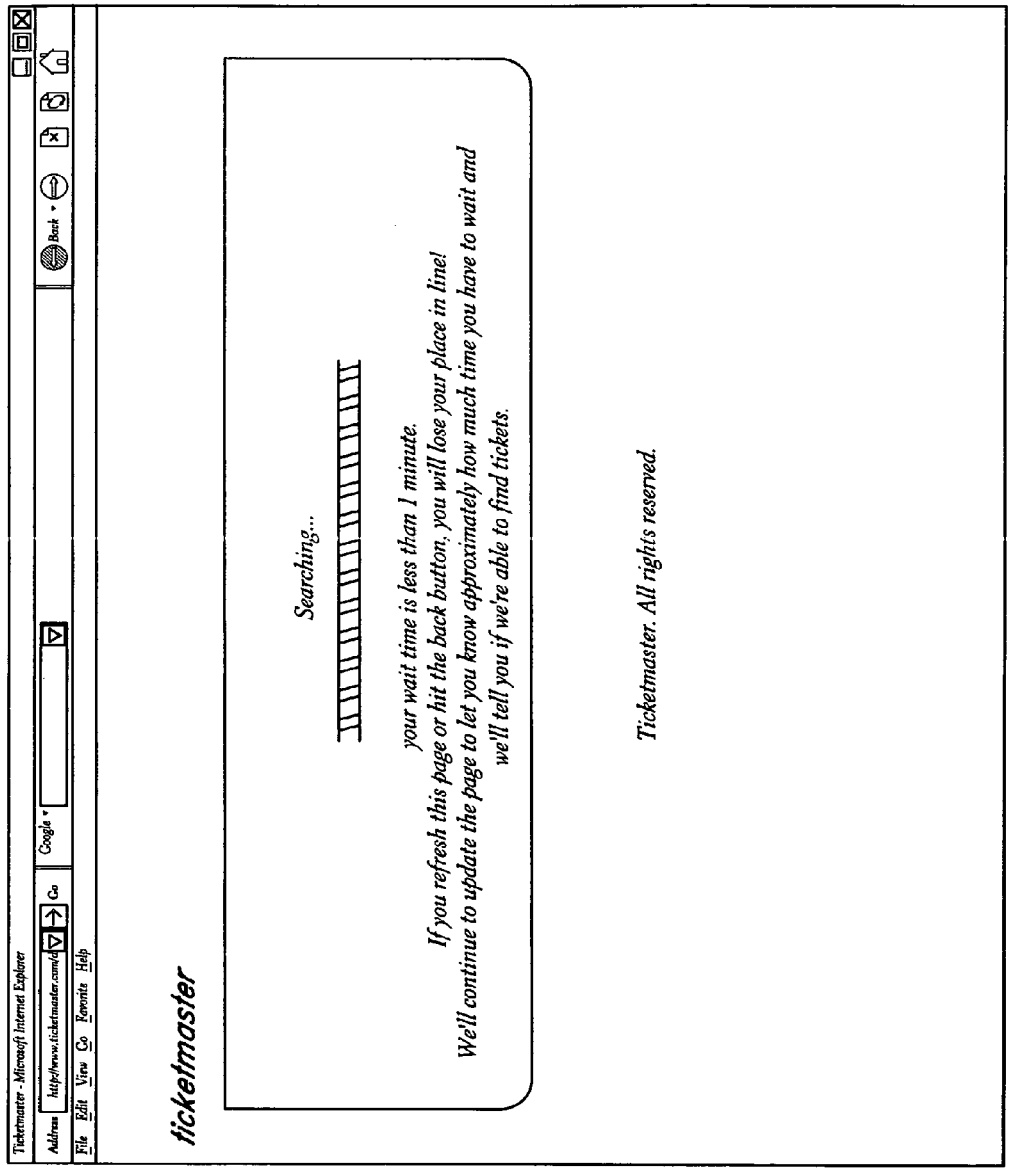

While the request is still in the queue, a delay or wait symbol is displayed on receipt of a server sleep message, and the browser sleeps for a specified period of time and then contacts the server again. The delay or wait symbol cam be, by way of example, a rotating horizontal striped bar, a clock, or other symbol. An example Web page depicting such a delay or wait symbol is illustrated in FIG. 6E. As discussed above, the time between browser request messages can be specified by the server via the command transmitted from the server to the browser. If the browser ceases to transmit the messages while the original request is still in the queue, a determination is made by the server-side system that the user has abandoned the transaction, and the request will be removed from the queue and/or ignored. If a browser issues requests at greater than a certain or predetermined frequency, indicating that the requests are being automatically made, such as by a robot or spider, the requests are optionally removed from the queue or otherwise ignored.

In addition, if a browser does not proceed correctly through a certain predetermined sequence of pages, such as Web pages, before issuing a request, the request will not be entered into the queue, or will be removed from the queue or ignored.

With reference to FIG. 1, in one example embodiment, a user terminal, such as terminals 102, 104, 106, can be a personal computer, an interactive television, a networkable programmable digital assistant, a computer networkable wireless phone, and the like, that optionally has access to the Internet 108 via a broadband network interface or via a dial-up modem. The user terminal can include a display, keyboard, mouse, trackball, electronic pen, microphone (which can accept voice commands), other user interfaces, printer, speakers, as well as semiconductor, magnetic, and/or optical storage devices.

The user terminal includes a browser or other network access software capable of performing basic Internet functionality such as rendering HTML code and accepting user input. The browser stores small pieces of information, such as digital cookies, locally, such as in user terminal non-volatile memory. The information can be accessed and included in future requests made via the browser. By way of example, a cookie can store customer, session, and/or browser identification information. The browser also accepts messages. For example, the browser can accept messages received over a network, such as the Internet 108, that cause the browser to "sleep" (to cease sending requests over the network) for a designated time period after which the browser then reconnects to a predetermined web address with a specified request message. Optionally, the request message can conventionally include a uniform resource locator (URL).

The following example components can be invoked or used during or in relation to a queuing process. The components can include session tokens, a front end switching network 110, a state and information data cache which can be stored in a first set of servers 112 that forms a high capacity front end, a second set of servers 114 that includes application servers, a third set of servers 116 responsible for controlling master queues of transactional customers, and core ticketing server system 118, which will be explained in greater detail below. Other embodiments can use or invoke different components then the foregoing components and/or can invoke additional components.

A description of the session token will now be provided. The session token is a piece of data generated as a user initiates certain ticketing core transactions. This session token is optionally encrypted to prevent tampering and contains components to direct the transaction's flow through the process including, by way of example, the issuing server's identification, the time of transaction initiation, and the resource type.

In an example embodiment, the session token has a structure that contains some or all of the following components, and their type:

---
session_sequence_number (integer value)
session_number (array of bytes)
source_queuing server (integer value)
queue_id (integer value)
queue_index (integer value)
queuing server_ip (integer value)
word cache_id (integer value)
serving_order (integer value)
The foregoing components will now be described.
--- session_sequence_number: The session_sequence_number is used to hold the state of a session within the transaction process. By way of example and not limitation, the state can be a "transaction not started" state, a "seats reserved payment not made" state, and so on. The session_sequence_number is used to detect duplicate inbound requests from outer layers of the network as well as to detect an improper sequence of requests as compared to the standard transaction process. In addition, the session_sequence_number can be used to distinguish duplicate identical requests caused by a user refreshing web page, or to distinguish multiple internal servers needing the same result sets as opposed to end users attempting to add multiple requests into the queue. For the former, cached results may be returned. For the latter, such requests may be denied or older requests may be removed from the queue.

session_number: The session number is a numeric, alphanumeric, or other code used to uniquely identify a session within a queuing server system. Being numeric or alphanumeric, the session_number can be used as a quick index for finding the internal session structure, without the need to resort to time consuming search techniques.

source_queuing server: The source_queuing server field contains the queuing server system id that initially issued the session token. Since a session is related to a ticket selling or transfer context on the core ticketing system (sometimes referred to as the "host"), under normal circumstances once a queuing server system 116 initiates a session, the session is completed on the same queuing server system. The source_queuing server field enables the proxy and application layers to route an inbound request from a user browser to the same queuing server at each step in the transaction. On failure of a queuing server system, session tokens intended for the failed system can be submitted to other queuing server systems in the network. When a queuing server receives a session token with a source queuing server number not matching its own id, the queuing server will assume there has been a server failure of the server corresponding to the id, and will attempt to take ownership of the session.

queue_id: A given queue server may handle many queues. By way of example, resources to communicate to each core ticketing server 118 may, in certain embodiments, need a separate physical queue. Such queues for each ticketing server 118 may be further broken down depending on the type of resources or for resources with certain privilege level, and each of those resources may need a queue corresponding to the nature of the request type. This queue identifier in the queue_id field may be used to quickly identify the physical queue the session is currently associated with.

queuing server_ip: As similarly discussed above with respect to the source_queuing server field, the queuing server_ip field is used to quickly route requests from the application and proxy layers to the queuing server currently owning or managing the session.

cache_id: The cache_id is used to quickly find an active task within the queuing server associated with a session. When a command has been issued which takes a substantial amount of time, such as more than 1 second (though other time periods can be used) by way of example, to complete, a task is created. By way of example, the command can be a reserve seats command, which may involve tasks such as pricing and inventory updating. On subsequent poll requests issued by the user browser, a session token with an associated cache_id allows the status of this task to be quickly determined By way of example, the poll requests can be issued periodically by the browser at times or periods specified by the server system. The cache_id can optionally be used in addition to the session_sequence_number in order to detect duplicate or out of sequence requests and appropriately handle responses that are already generated.

serving_order: The serving order is a field which contains a priority and a time component. The serving order is used when a queuing server attempts to take ownership of a session from another failed queuing server. The priority portion is used to determine which of multiple queues a session will be assigned. The time portion is optionally derived from a clock tick on the core ticketing system. In the event of a server failure, this allows sessions generated on different queuing servers to be roughly compared in priority to sessions generated on other servers.

Front end switching network. The front-end switching network 110 (also referred to as a proxy layer) dynamically directs user requests to an appropriate server sets based on relative server load, server availability, and the request transaction state.

A state and information data cache that is maintained in the server network. The state and information data cache holds copies of some or all transactional information for each active customer as well as information regarding each customer's progress through the transaction process. The data cache optionally also holds static or relatively static system-wide information to avoid the need for core ticketing server system 118 intervention.

A first set of servers 112 that forms a high capacity front end. This first set of servers 112 responds directly to simple or selected requests for information. The first set of servers 112 can optionally forward selected or more complex requests or transactional requests to deeper level servers. The first set of servers 112 can enforce transaction flow rules. The flow rules can be stored within the first set of servers 112, the second set of servers 114, or elsewhere. In combination with the front end switching network 110 and state cache, this layer can detect and block unreasonable or suspicious transaction flow rates that may be indicative of access by undesirable entities. Such unreasonable or suspicious transaction flow rates may be associated with robots under the control of ticket scalpers or the like which may be trying to buy or temporarily tie up tickets so that other users cannot purchase the tickets via the system, and would instead be more likely to buy tickets from the scalper at a significant premium over face value.

In one optional embodiment, a second set of servers 114 includes application servers that are responsible for generating transactional pages, populating the data cache, providing logic and/or rules for the transaction flows, and sequencing requests to the ticketing transactional core servers.

A third set of servers 116 is responsible for controlling the master queues of transactional customers. By way of example, the controllers can perform the following actions: maintain variable transaction timers (such as reservation timers), detect transaction abandonment, prioritize customers based on transaction type and resource requested, calculate estimated time until requests will be serviced, suggest or determine redirect timings, detect or determine ticketing core system load, manage inbound core transactional flow, and detect transactions that can be handled by the third set of servers without being forwarded to the core transactional system servers, discussed below. The queue managers can continuously and/or periodically monitor the core system load, and forward queued requests to the core system as sufficient resources become available. This process can optionally occur independently of inbound requests.

A set of core ticketing servers 118 is responsible for handling basic transactions such as inventory management, financial information, and customer data.

In an example embodiment, the basic flow of the system for transactions in progress is based on polling of the system by the user browser. The browser initiates a request which is placed in a queue. By way of example, the queue can be a priority queue, a first-in-first-out queue, a last-in-last-out queue, or other type of queue. Until this request completes or the user abandons the transaction, a sequence of messages passes between the browser and a corresponding responding server on a periodic basis. The rate of these messages is variable and can be based on system load and/or on the location of requests within a queue. For example, at different system load thresholds, different message rates can be used, so that the higher the system load, the lower the message rate. The failure of the browser to transmit messages within a predetermined period indicates that the user may have abandoned the transaction.

Optionally, a relatively shorter predetermined period of time may be used to determine whether a request is a possibly (as opposed to a highly likely) abandoned request. If a browser message has not been received within the shorter period of time, the request may be allowed to remain in the queue, but the request will not be serviced until another message is received for such session. A relatively longer predetermined period of time may be used to detect a request which has a higher likelihood or certainty of being abandoned. If a browser message has not been received within the longer period of time, the request can optionally be removed from the queue permanently. The ongoing message communication is optionally achieved without user intervention by having the responding server pass timed redirect messages back to the browser. If the message includes a URL, then by repeating the message, the browser is "refreshing" the URL.

A customer or user web request is directed by the front end switching network to the appropriate set of servers. The switching network bases its decision as to which server is to handle the request on one or more of the following criteria.

1) The failure status of hardware in each section of the server set.

2) The available processing resources in the various sections of the server set.

3) If the transaction has already been initiated via a prior request. If this has occurred, the switch network attempts to pass the request through a similar path to minimize or reduce inter-server data movement.

4) Based on data collected from various sources. Based on the collected data, these servers in conjunction with the high capacity front end, can block transactions which are initiated by automated systems, such as robots operated by scalpers or other undesirable entities, as opposed to legitimate users.

Figure 2:
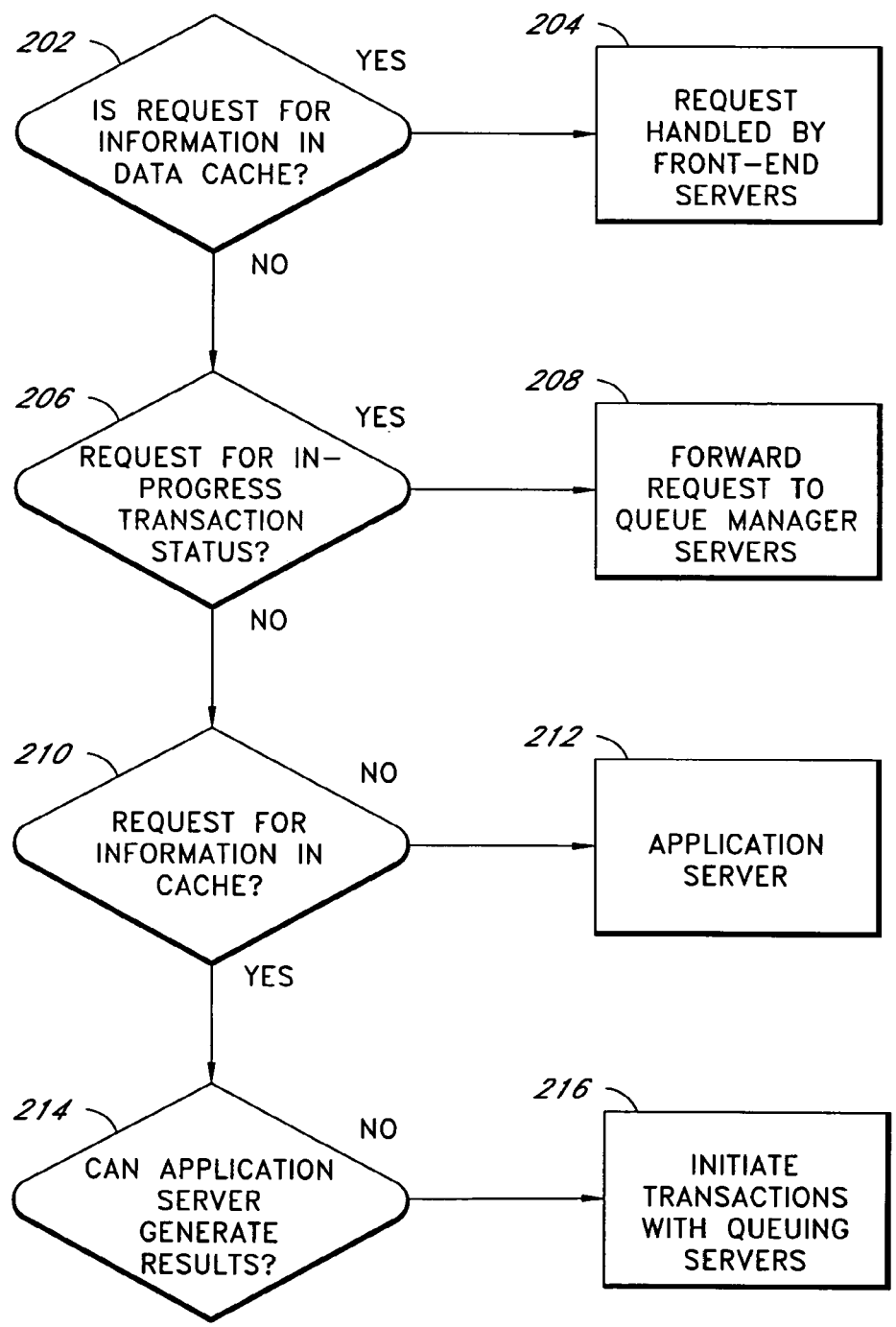
FIG. 2 illustrates an example request disposition process.

The high capacity front-end server receives the browser issued request, determines the request disposition, and selects the appropriate actions to be taken. An example request disposition process is depicted by FIG. 2:

1) At state 202, if the request is for information that is held in the data cache, at state 204 this information is optionally handled directly by the high capacity front end server.

2) At state 206, if the there is a request for the status of an in-progress transaction, at state 208, the request is forwarded to the queue managers. Incomplete transactions result in the generation of redirect web pages, otherwise requests are forwarded to the application layer for web page generation.

3) At state 210, if the request is for information not stored in the data cache or if the request is part of the transaction flow, at state 212, the request is forwarded to the appropriate application server as chosen by rules similar to those used by the switching network. At state 214, if the application server cannot generate results completely within itself, at state 216, the application server can initiate transactions with the queuing servers.

The front-end server includes a request throttle that provides or attempts to provide substantially equal computing resources to users accessing or attempting to access the resources, while enforcing certain "Access and Interference" rules of use. By way of example, the rules of use can specify that users are not to use any robot, spider, other automatic device, or manual process to monitor or copy ticketing web pages or the content contained thereon or for any other unauthorized purpose without the site operator's prior written permission. The rules of use can additionally specify that users are not to use a device, software or routine to interfere or attempt to interfere with the proper working of the system and/or associated web site. The rules of use can specify that users are not to take an action that imposes an unreasonable or disproportionately large load on the system infrastructure or resources. The rules of use can further specify that users are not to copy, reproduce, alter, modify, create derivative works, or publicly display Web site content, except for the user's own personal, non-commercial use without the prior permission of the system operator.

In one embodiment, the fair access core throttle is optionally implemented using the following logical components: a session management module, a proxy network verification module, and a real-time throttle module.

The session management module independently manages the creation and validation of substantially tamper-proof sessions and browser cookies. Cookies generated by the session management module are encrypted, and made unique via a code and/or the like. The session management module provides its peer modules, including selected or all server side components, with unencrypted access to active session and browser cookies.

The proxy network verification module provides the fair access core throttle module with a public interface, exposed directly to the public Internet or other public network, for network verification. If the core throttle module determines that action, such as blocking access, should be taken against an individual source IP address because of violation of the access and/or interference rules, the verification module first verifies that the source address associated with the offending use is not that of a known proxy network. For example, the system can keep a list of known robots, which can then be blocked immediately. Known proxy networks have their IP addresses optionally stored in network byte order, such as in two DB hash files. The compiled DB files are optionally optimized for fast real-time lookups. During network verification, an example embodiment of the throttle module uses the client IP address, the contents of the two DB hash files, and corresponding binary arithmetic to determine whether or not the source IP is that of a known proxy network. The proxy network verification module thereby limits the scope of a potential block to a selected individual client, rather than inadvertently blocking a collection of proxied clients that are not violating the rules.

The fair access core throttle module utilizes features provided by the session module and the proxy network verification module. The core throttle module is responsible for determining when to deny access to system's web infrastructure. The throttle module records a series of attributes associated with a given request: browser id (BID), session id (SID), source IP, network CIDR (Classless Inter-Domain Routing) block, time stamp, and/or block state. The request attributes are stored in a shared memory file system, and subsequent requests are ensured "sticky" by upstream networking hardware, such as cache servers that can optionally be operated by third party entities. The network attribute is in whole or in part the result of a common bit mask applied to the client IP address. Its granularity is selectable and configurable. For example, a bit mask, such as a 24 bit mask, is applied to the source IP addresses so that entire class C's (corresponding to networks of 256 or fewer devices) can be tracked. Optionally, other size masks can be used and other class sizes can be tracked. The core throttle module uses the following configurable windows (floating time period, in seconds), to determine violation of policy or rules: the CIDR window, and the cookie (SID/BID) window. Each window has a corresponding maximum number of requests specified.

If the request maximum is reached during the configured time period, subsequent requests are blocked from the corresponding IP address. The duration of the block time is also configurable. Optionally, the throttle module will track source IP address, rather than SID/BID, if client cookie information is unavailable. The throttle module employs the network verification module, prior to applying a block to a given source IP address.

If a request is routed to an application server, then upon receiving the request, the application server can perform one or more of the following actions:

1) Generate web pages and populate the data cache for system wide information pages 2) Populate the data cache from core servers 3) Detect invalid motion through the transactional process, such as the use of the browser back button or the accessing an information page by directly entering the corresponding URL into the browser address field, rather than navigating to the information page by first passing through the appropriate other information pages.

4) Update the state cache with transactional data

5) Issue core transaction requests to the queue management servers

The queue management servers perform one or more of the following actions on various requests:

1) New transactions initiate the generation of a new session token. The queue managers determine the correct queue into which the transaction should be placed based on core server status, the nature of the inventory being requested, and/or the transaction type.

2) The session token is received by the queue managers on subsequent requests so that the queue manager can quickly associate the inbound request with transactions being managed by the server.

3) Requests for core static data are either service out of a local cache or forwarded to the core servers as necessary.

4) The queue managers optionally continually examine core system load and forward queued requests to the core as resources become available. This process happens independently of inbound requests. The queue manager may also automatically complete a transaction without forwarding it to the core based on data inferred from recent transactions.

5) As requests complete in the core ticketing server system 118, the queue managers start transaction timers such that a lack of communication from the user after a transaction has been queued or completed will be determined to be an abandonment.

6) Status requests can result in transaction complete responses, transaction abandoned responses, or transaction in-progress responses. If a transaction is considered to be in-progress, an estimate of time until the transaction or transaction request will be serviced is calculated based at least in part on the transaction's place in queue and/or the rate at which the core is able to handle requests. From this estimate the system can dynamically determine the redirect frequency.

In particular, in an example embodiment, the queue managers can provide a host load throttle that dynamically determines the number of concurrent requests that should be allowed to access the ticketing core at a given point in time. The host load throttle manages the concurrent requests so as to achieve or attempt to achieve the following goals:

1) attempt to or succeed in maintaining core load centered around a specified average or median response time.

2) ensure the number of connections with user terminals do not drop below a specified floor value.

3) ensure the number of connections do not grow above a specified ceiling value.

4) limit the rate of growth of host or core load in response to spikes in demand so that host load grows smoothly.

5) react to changes in demand smoothly both on increases and decreases in changes in demand 6) react more aggressively as far as decreasing host load to achieve the goal than would be done to increase host or core load.

The algorithm variables involved in appropriately throttling or controlling concurrent requests include:

frequency: This algorithm is called periodically at a very specific rate. Based on this frequency the algorithm translates call counts (the number of times the algorithm has been called over a specific or selected time frame) into times.

new_allowed_request_count: The number of requests the host can accept which will most closely achieve the goals.

current_request_count: The number of requests currently active on the host.

request_floor: The lowest number of outstanding requests the algorithm will allow.

request_ceiling: The highest number of outstanding requests the algorithm will allow.

desired_host_response_time: The optimal or preferred host load in terms of the time it takes to respond to a request.

maximum request_increase_rate: The maximum number of new requests that can be added to the host per unit time current_host_load: The current measurement of the host's response time.

tracking_steps: The rate in terms of calls at which the algorithm will achieve the desired host load. The tracking steps can be selected to obtain a relatively steady state system load, in a graceful manner. For example, a desired average system load is optionally achieved with relatively small deviations from the average load, rather than fluctuating wildly around the desired average load. Thus, the appropriate selection of the tracking steps, as described below, avoids the system overacting to sudden demands, and avoid having the system to attempt to respond to short, extreme spikes in demand.

The algorithm uses a function similar to the n item geometric mean equation:

eln(desired_load/current_load)/tracking_steps

Figure 3:
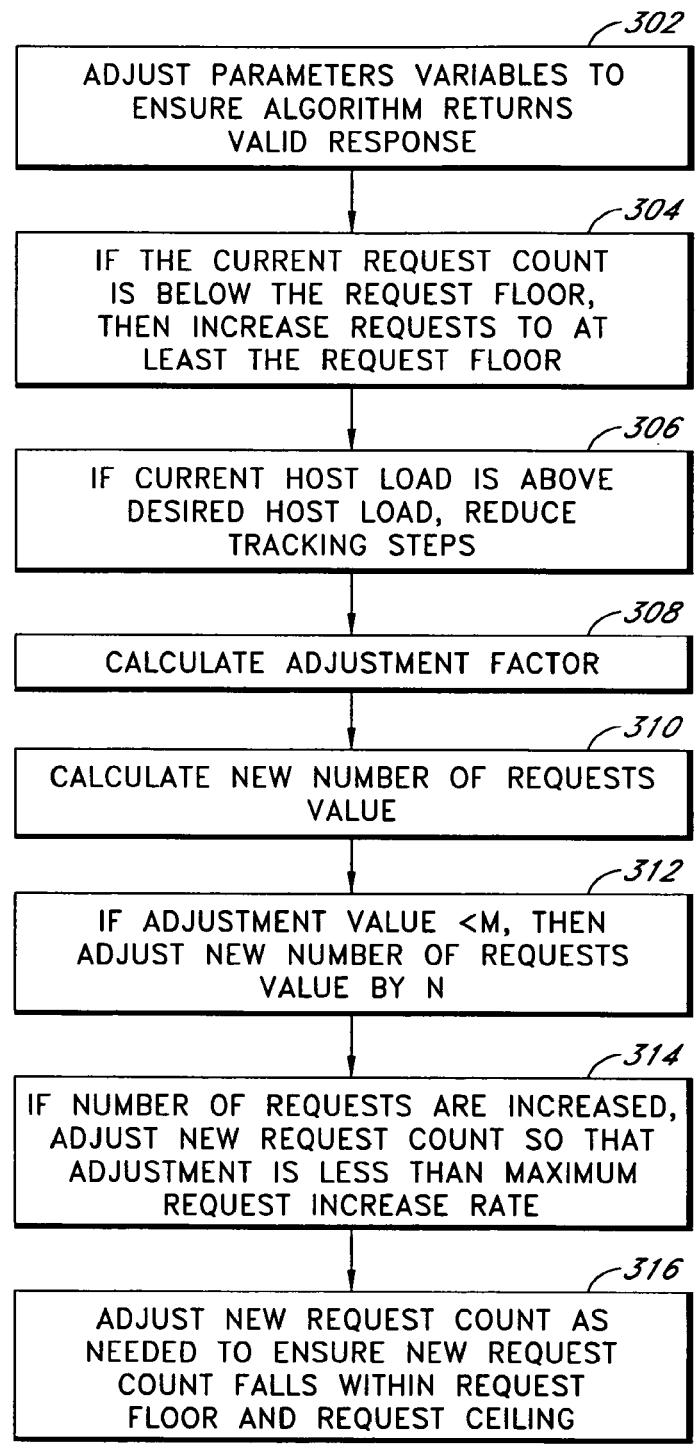
FIG. 3 illustrates an example throttle process.

An example throttle process is illustrated in FIG. 3. As illustrated in FIG. 3, at state 302 the variables are adjusted to ensure that algorithm does not return an invalid answer. For example, the variables or parameters can be adjusted to a minimum value to ensure an overflow or divide by zero condition does not occur. At state 304, if the current request count is below the request floor, then the number of requests passed to the core is increased to at least the request floor. At state 306, if the current host load is above the desired load, that is, the desired core response time, then the tracking step is decreased, for example, the tracking steps can be decrease 25%, 50%, or by other percentages. At state 308, the adjustment value, if any, is then determined. By way of example, the adjustment factor can be calculated using a geometric mean like equation. The example geometric mean like equation discussed above can be used as follows:

$$\text{adjustment value} = e^{ln(desired\_load/current\_load)/tracking\_steps}$$

At state 310, the new number of requests allowed to access the ticketing core at a given point in time is determined. For example, the new number can be calculated based on the current number and the adjustment value. By way of further example, the following equation can be used to calculate the new number of requests, though other equations and techniques can be used as well:

New Number of Requests=Integer[Round_UP(adjustment value*current number of requests)]

where the new number of requests is set equal to the integer portion of the rounded-up value of the adjustment value multiplied by the adjustment value. At state 312, if the adjustment value is less than a first threshold "M", such as a very small value or fraction of a request, then the value of the new number of requests is modified in the appropriate direction by a number of requests "N". For example, N can have a value of +2 or −2.

At state 314, if the number of requests are increased, the new request count is adjusted to ensure that that request adjustment amount is less than maximum request increase rate. In addition, at state 316, the new request count is adjusted up or down as needed to ensure that the new request count falls within the range defined by the request floor and the request ceiling.

Requests issued via user browsers are typically asynchronous with respect to requests from other user browsers. There are two example occasions when asynchronous requests can time out: before the request is processed if the request hasn't been "pinged" recently by the user browser (implying the user has canceled his request); and if the request has been processed but has not been "picked up" by the user, wherein the user has not completed the next transaction step within or approximately within the allotted time.

It is very likely that in some cases requests will be made, but then, before they can be serviced, the customer will abandon their request. For example, a common scenario is that the user will select tickets for potential purchase, and "navigate" the user web browser away from the system Web site before completing the ticket purchase process. As similarly discussed above, the system attempts to prevent users from unduly reserving tickets when the user is no longer interested in the tickets, so the system optionally requires the user browser to keep polling the system to indicate that the user is still interested in the ticket.

Optionally, each time the user browser pings or polls the request, the browser will be notified of an estimated wait time or poll timing. The proxy layer can determine the poll timing or interval based on the estimated wait time. The system can transmit the notification over the network to the user browser. The browser uses the poll interval or timing information to time future polling operations. The estimated time can be divided by a given number, such as 10. A "fudge factor" is optionally provided to ensure that the request is not dropped as a result of the network being slow, rather than a failure of the browser to poll. If the result is greater than a first threshold, such as 45 seconds, the browser will poll again after a first delay, such as 45 seconds. If the result is less than a second threshold, such as 4 seconds, the browser will poll again after a second minimum delay, such as 4 seconds.

If the request is now ready to be processed but it hasn't been pinged or polled in the last n milliseconds, then the request is not processed, but rather marked as timed-out. The n milliseconds can be defined as minimum (the value in the polling server setting, [the estimated time/10+20000]), though the value can be calculated using other formulas and/or constants.

If a response has been processed but not "picked up" for n milliseconds (where "n" is defined and adjustable via runtime configuration parameters, or as otherwise defined or configured) then the response is released and marked as expired. For example, this can occur if the user browser fails to poll or ping after the request has been processed. In such instances, resources reserved for such requests may also be released.

Figure 4B:
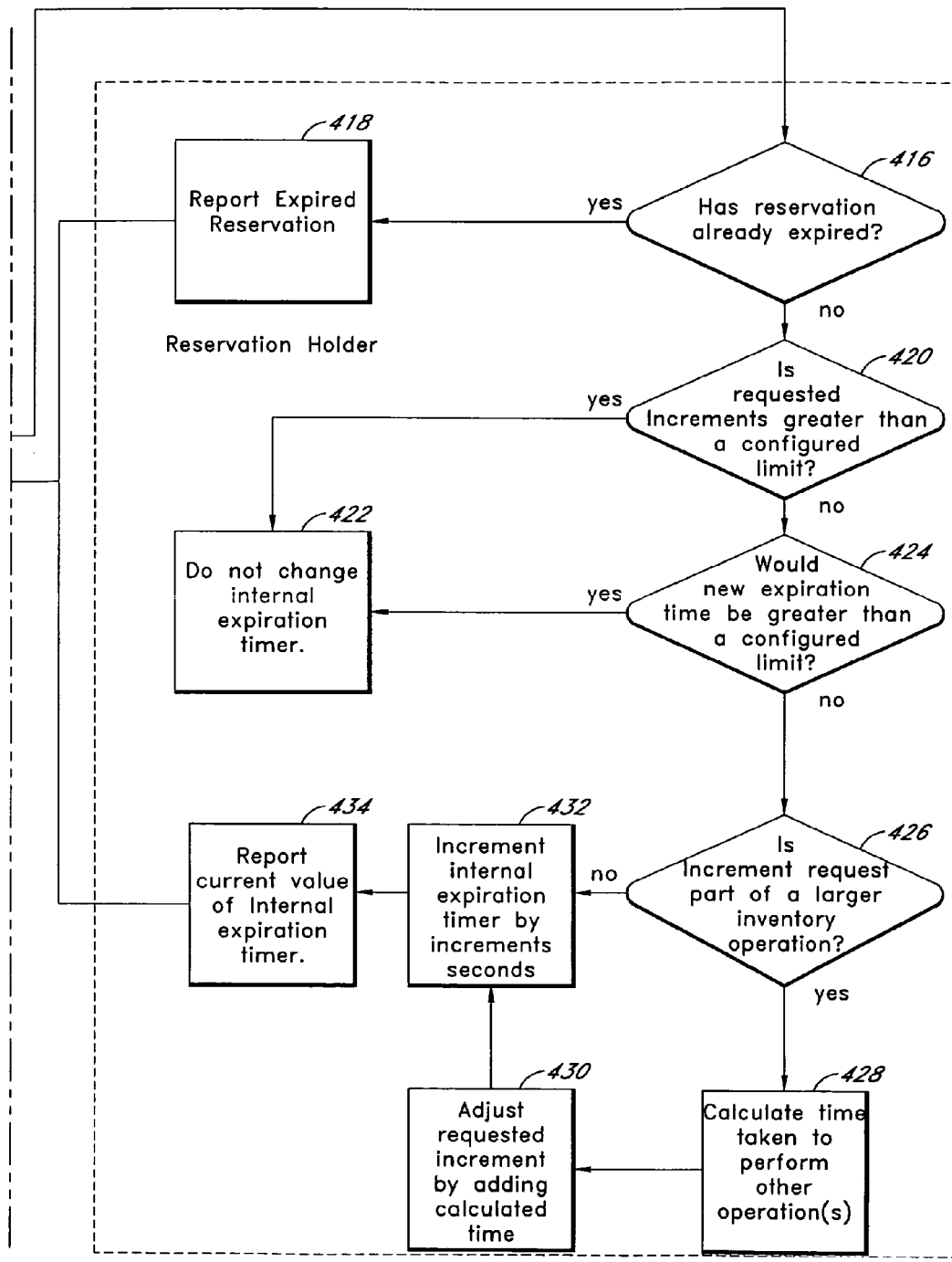

FIGS. 4A-B illustrate an example adjustment process of a reservation timer. At state 402, a name application step is executed. At state 404, the time increment corresponding to the application step is retrieved from a database, file, or the like, or is dynamically calculated. At state 406, a determination is made as to whether there is a configured time increment. If yes, the process proceeds to state 408, and a time increment request is issued to a reservation holder module which performs an increment determination process, as discussed below. By way of example, the "configured time increment" can be a positive time adjustment to the reservation timer based on the named current position in the application. Steps in the application are optionally named and time increments can be associated with these names. Procedurally, the application can examine where it is in its own flow. For each namable point in that flow, the application looks for a time increment to go with that name. The lookup process for this increment optionally involves looking in a configuration file or in a database for the corresponding increment. This lookup can vary based on one or more of the step name and the type of backend used to perform the ticketing process. These configuration values can be changed dynamically without restarting the system.

At state 410, once the increment determination has been made, a determination is made as to whether the increment was successful. For example, when a configured time increment is found, the application requests that time addition from the reservation holder. The reservation holder may choose to reject that request based on internal logic or rules. An example of this would be a configured maximum increment or a maximum total accumulated time across all increment requests. This is done to prevent someone from gaming the system and incrementing the timer indefinitely.

If the increment was successful, the process proceeds to state 414, and the application proceeds to the next application step. By way of example and not limitation, the step can be a page view, a button press, a link activation, or the reaching of certain data conditions. If the increment was not successful, the process proceeds to state 412, and the error is logged or displayed based on error type and/or severity.

With respect to the reservation holder module, at state 416, a determination is made as to whether the reservation has expired, that is, the browser has not polled or the user has not taken a necessary action within the time increment. If the reservation has expired, the process proceeds to state 418, and a report is provided to the user browser for display to the user regarding the expired reservation. If the reservation has not expired, the process proceeds to state 420 and a determination is made as to whether the increment has exceeded a defined limit before being used. If yes, the process proceeds to state 422, and the internal expiration time is not altered, and at state 434 the current value of the expiration timer is reported in response to the request for the time increment at state 408.

If at state 420, a determination is made that the retrieved or calculated increment has not exceeded the defined limit, the process proceeds to state 424, and a determination is made as to whether the retrieved or calculated expiration time is greater then a configured limit. If the new expiration time is greater then a configured limit, the process proceeds to state 422, and the expiration time is left unaltered.

If the new expiration time is not greater then a configured limit the process proceeds from state 424 to state 426, and a determination is made as to whether the increment request is part of a larger inventory operation, such as for a compound inventory operation involving more than one event. If yes, the anticipated time needed to complete the other tasks or operations involved in the larger inventory operation. At state 430, the increment time is adjusted by adding or subtracting the calculated time, as appropriate. The process proceeds from state 430, or from state 424 if the new expiration time is not greater then the configured limit, to state 432, and the internal increment timer is incremented by a selected or predetermined number of increment seconds. The process then proceeds to state 434, and the current value of the expiration timer is reported in response to the request for the time increment at state 408.

Figure 5A:
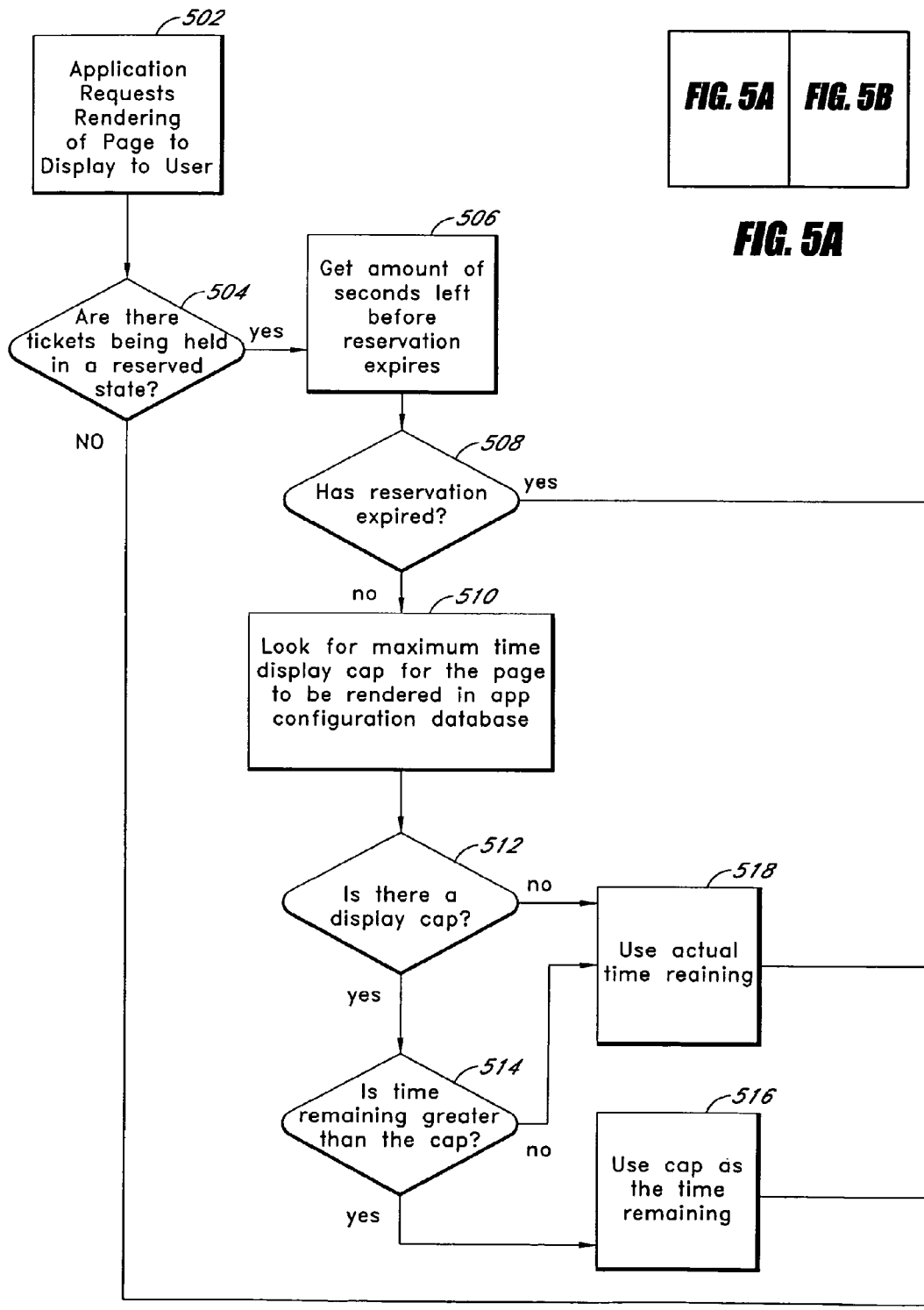
FIGS. 5A-B illustrate an example process of providing a user with information on remaining time to complete a task to avoid abandonment of the user's place in a request queue.
Figure 5B:
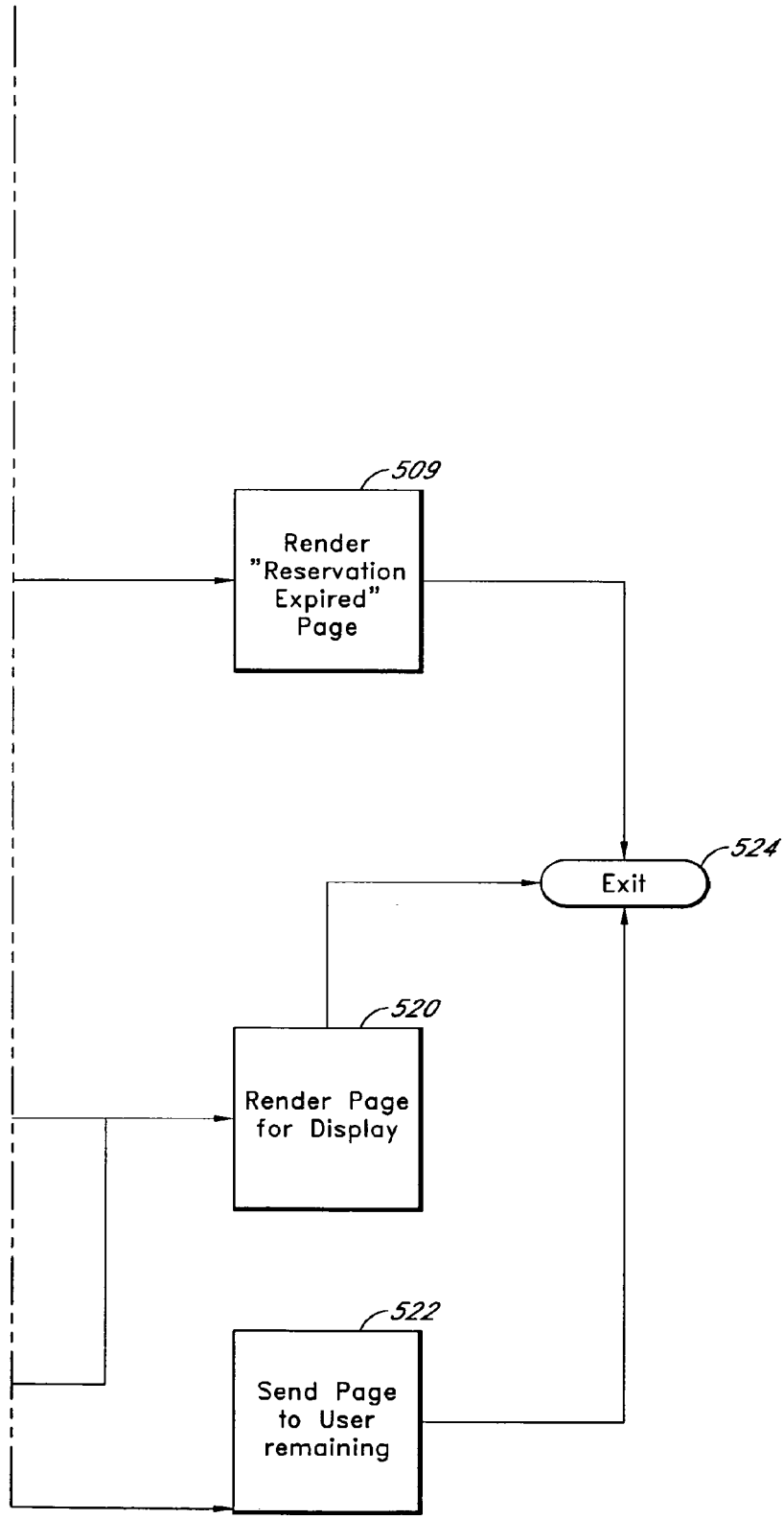

FIGS. 5A-B illustrate an example process of providing a user with information on remaining time to complete a task to avoid abandonment of the user's place in a request queue. By way of example, the task can be providing payment authorization for tickets already selected or reserved by the user. At state 502 an application requests rendering of a Web page for display to the user, such as that illustrated in FIGS. 6A-C. At state 504 a determination is made as to whether the user has tickets in a reserved state. If there are no tickets in the reserved state for the user, the process proceeds to state 522 and the Web page, which may be unrelated to the held reservation or transaction, is sent to the user browser for rendering. The process proceeds from state 522 to the exit state 524.

If there are tickets in a reserved state for the user, the process proceeds from state 504 to state 506, and the system retrieves the amount of time left for the user to complete the task before the reservation expires. The process then proceeds to state 508, and a determination is made as to whether the reservation has expired. If the reservation has expired, the process proceeds to state 509, and a reservation expired page, such as that illustrated in FIG. 6D, is transmitted to the user browser for rendering. The process proceeds from state 509 to exit state 524.

If, at state 508, the reservation has not expired, the process proceeds to state 510, a maximum time display cap for the page to be rendered is searched for in the application configuration data, or in a database. At state 512, a determination is made as to whether there is a display cap. If there is a display cap, the process proceeds to state 514, where a determination is made as to whether the time remaining for the user to complete the task is greater than the cap. If the time remaining is greater than the cap, the process proceeds to state 516, and the time remaining is used as the cap. If the time remaining is less than or equal to the cap, the process proceeds to state 518, and the actual time remaining is used as a cap. The process then proceeds to state 520, and a page, including the cap or time remaining information for completion, is rendered for display, and the process then proceeds to the exit state 524.

In order to reduce the load on other parts of the system, such as on the core or host servers, when a resource request is abandoned, the associated "abandoned" resource can be reused or associated with one or more similar resource requests in the queue. For example, if a first user requests 2 adult tickets at a particular price level to a particular event, a host connection is found, an electronic shopping cart is established, and the 2 tickets matching the request are "placed" in the shopping cart. The shopping cart and/or tickets can be considered a "resource." By way of further example, if the request is for 1 ticket for a specific event with open (non-assigned) seating, a similar request could be another request for 1 ticket for that specific event. Another resource example can be a request failure notification request. Optionally, a request can be considered similar if the requested resource has at least one common attribute with the resource in the original request.

The resource request can be queued. If the first user abandons the request for the tickets or other resource, optionally, rather than removing the request from the queue, the queue can be scanned by a scanner module or the like in order to locate a similar resource request. In this example, the resource request can be a request from another user for 2 adult tickets at the same price level for the same event as in the first user request. The shopping cart and/or tickets in the shopping cart can now be assigned to the second user request via an appropriate identifier.

When an abandoned resource is assigned to a similar request, the request can optionally be advanced in the queue to the position of the abandoned request or to the head or first position in the queue to better ensure a sale of the tickets is made quickly.

In order to more efficiently assign abandoned resources to other requests, optionally a cache of abandoned resources can be kept in local memory, wherein the abandoned resources are kept in the abandoned resource cache for a predetermined amount of time or other period of time. If no similar requests to which the cache abandoned resource can be allocated to are located within the period of time, then the cached resources can be returned to a resource pool after a certain or predetermined amount of time.

In addition, in order to avoid keeping a resource which has been abandoned many times in a queue, and hence is less likely to be actually used in the near term, if a cached resource has been repeatedly assigned and abandoned more than a predetermined number of times within a predetermined time period, the repeatedly abandoned resource is optionally removed from the resource cache and returned to the resource pool.

FIGS. 6A-6E illustrate example user interfaces for a ticket purchase process. The user interfaces can be Web pages transmitted by the system to the user browser for rendering. FIG. 6A illustrates a shipping Web page form with which the user is asked to specify how the tickets are to be delivered (UPS delivery, UPS Saturday delivery, standard mail, electronically, etc.). The form further lists the event, the event date, time and location, seating information, and prices. The form also informs the user how long the user has to complete the form (the cap), in this example, 1 minute and 45 seconds, before the seats are released for others to purchase. During the 1 minute and 45 seconds, the tickets are reserved for the user so that others cannot purchase the tickets. Of course, other time periods can be used as well.

FIG. 6B illustrates an example account creation form, presented after the form illustrated in FIG. 6A is successfully completed. The user is asked to enter account information, including the user first name, email address, zip code, and password. The form depicted in FIG. 6B also informs the user how long the user has to complete the form, in this example, 1 minute and 30 seconds, before the seats are released for others to purchase. FIG. 6C illustrates an example billing information form, presented after the form illustrated in FIG. 6B is successfully completed. The user is asked to enter the user's name, credit card number, expiration date, and the like. The form depicted in FIG. 6C also informs the user how long the user has to complete the form, in this example, 3 minutes, before the seats are released for others to purchase.

FIG. 6D illustrates a Web page transmitted from the system to the user browser for presentation in the event the user does not complete one of the forms discussed above, or other specified task, within the corresponding allocated time limit for completion. The page informs the user that the time limit has been exceeded and the tickets have been released. The user can click on a "return to event page" button to select a different or the same event, and similarly repeat the ticket purchase process.

Optionally, in order to reduce the load on the application servers and/or other portions of the system, rather than passing through all user requests or polls for queue status information, only a portion of the status or polling requests are passed through to obtain the actual status of a request, and the remainder of the requests can be responded to using an estimated queue status. For example, the requested queue status can relate to how long it will take to service a resource request, or the position of a request in the queue.

By way of illustration, if the queue contains 50,000 resource requests, optionally only the first 500 (or other selected number) status requests within a predetermined period of time will be passed to the queue server, while additional requests within that period of time will be provided with estimated status by the proxy layer.

By way of example, the estimate can based on which session token is currently at the top of the queue and the current rate of requests being fulfilled per second (or other time period). Optionally embedded in each session token associated with a request is an ordinal position in each corresponding queue. One example estimate of the amount of time it will take for a request to be serviced can be calculated by retrieving the ordinal position in the queue embedded in the poller's session token and retrieving the ordinal position in the queue embedded in the session token at the top of the queue, calculating the difference between the two ordinal positions, and multiplying that difference by the average (or other appropriate statistical) rate of consumption for that queue.

Thus, for example, a communications protocol can be established between the proxy layer (such as the front end servers 112 illustrated in FIG. 1) and one or more of queue servers (such as the queue controller servers 116) in which the queue server informs the proxy server of the status of all or a selected portion of the queues currently being handled by the queue server. Optionally, the queue server informs the proxy server which session token holders may directly poll for their request status via the queue server.

In addition, the queue server optionally informs the proxy server as to which session token is currently at the top of the queue and the average rate of consumption of requests from each queue (which can be expressed in terms of requests fulfilled per second). The queue server can then optionally decide which session token holders may directly poll for their request status based on a configured maximum number of pollers and the number of active queues on the queue server. For example the determination can be based on the configured maximum number of poller divided by the number of active queues on the queue server.

Based on some or all of the information received by the proxy server from the queue server, the proxy server can inform pollers in the queue as to the approximate amount of time it will take to reach the top of the queue and/or for the request to be serviced.

As previously discussed, many requests can be received for a given resource. Optionally the requests can be balanced and/or processed by one or more queues by creating multiple queues based on the type of request. Optionally, priority levels can be set for each request in each queue, using predetermined criteria, attributes, request origin, an algorithm, and/or the like. For example, a request-type can correspond to a ticket request, an auction request, a customer service request, an account information request, a help request, and so on. By way of further example, a higher priority can be associated with ticket requests than account information requests.

The priority levels can be used to determine in which order requests from each queue gain access to the requested resource. For example, based on request attributes, requests can be differentiated and optionally categorized into one or more request groupings. Further, requests can be optionally differentiated and categorized into one or more request groupings based on demand for the activity for which the resource will be used. By way of illustration and not limitation, if the system was attempting to obtain an operator code for the purpose of reserving a ticket for a specific event, the demand on that event can be examined and/or counted to determine how such requests are to be organized in the queue.

As similarly discussed above, the queue request priority levels can be based on attributes of the request or the origin of the requestor, such as which computer system or channel originated the request.

By way of further example, where multiple queues exists, the order in which to fulfill requests from the multiple queues can be based on the amount of resources being allocated to a given type of request, as well as one or more threshold or preset values. For example, one or more of the following rules and preset values, stored in and accessed from computer readable memory, can be used to determine how to allocate resources to requests:

Do not allocate additional resources to the type of requests that are currently consuming more than first preset number (which can be a desired maximum number) of resources from a corresponding resource pool;

If less than a second preset number (which can be a desired minimum number) of resources are used by a type of requests in queue, allocate the next available resource to a request of this type;

If less than a third preset number (which can be a desired minimum number) of resources are used by multiple types of requests in queue, allocate the next available resource to a request type that has the smallest (current number of resources consumed by this request type/preset minimum number of resources for this request type);

If no request type in a given queue is consuming less than a fourth preset number (which can be a desired minimum number) of resources, the next available resource is allocated to a request type that has the smallest (current number of resources consumed by this request type/preset goal number of resources for this request type).

The second, third, fourth, and other preset numbers can optionally have different or the same values. Further, the foregoing preset numbers can optionally be configurable during run time for each request type.

Thus, as described herein, certain embodiments provide efficient and fair queuing processes and apparatus to provides user access to resources, such as those involved in ticket transactions, including tickets. It should be understood that certain variations and modifications of this invention would suggest themselves to one of ordinary skill in the art. The scope of the present invention is not to be limited by the illustrations or the foregoing descriptions thereof.

What is claimed is:

1. An electronic ticketing system, comprising:
   a computing system including one or more computing device;
   non-transitory memory storing one or more modules, that when executed by the computing system, cause the computing system to perform operations, comprising:
   providing over a network a first ticketing Web page form for display on a first client system to a user;
   determining if the user has a ticket in a reserved state by accessing information stored in computer readable memory;
   adjusting a first value related to an amount of time the user has to complete the first ticketing Web page form before expiration of the ticket reservation, wherein the first value is adjusted based at least in part on system load;
   using the adjusted first value, providing an indication, including a time value substantially corresponding to the adjusted first value, to be displayed to the user via the first client system as to the amount of time the user to complete the first ticketing Web page form before expiration of the ticket reservation;
   determining if the user has failed to timely complete the first ticketing Web page form; and
   at least partly in response to a determination that the user has failed to timely complete the first ticketing Web page form,
   causing a reservation expiration notice to be presented to the user by the first client system.

2. The system as defined in claim 1, the operations further comprising:
   providing for display to the user a second ticketing Web page form;
   retrieving from computer readable memory a second value related to an amount of time the user has to complete the second ticketing Web page form before expiration of the ticket reservation,
   wherein the second value, related to the amount of time the user has to complete the second ticketing Web page form before expiration of the ticket reservation, is different than the first value, related to the amount of time the user has to complete the first ticketing Web page form before expiration of the ticket reservation;
   providing an indication to the user as to the amount of time the user to complete the second ticketing Web page form before expiration of the ticket reservation.

3. The system as defined in claim 1, wherein the first ticketing Web page form is a ticket delivery page configured to enable the user to specify how the ticket is to be delivered to the user.

4. The system as defined in claim 1, wherein the first ticketing Web page form is an account information page.

5. The system as defined in claim 1, wherein the first ticketing Web page form is a payment page configured to enable the user to specify a form of payment to be used.

6. The system as defined in claim 1, wherein the reservation expiration notice is a Web page provided for display on the first client system.

7. An electronic ticketing system, comprising:
   a computing system including one or more computing device;
   non-transitory memory storing one or more modules, that when executed by the computing system, cause the computing system to perform operations, comprising:
   providing over a network a first ticketing Web page form for display on a first client system to a user;
   determining if the user has a ticket in a reserved state by accessing information stored in computer readable memory;
   adjusting a first value related to an amount of time the user has to complete the first ticketing Web page form before expiration of the ticket reservation, wherein the first value is adjusted based at least in part on system load;

using the adjusted first value, providing an indication, including a time value substantially corresponding to the adjusted first value, to be displayed to the user via the first client system as to the amount of time the user to complete the first ticketing Web page form before expiration of the ticket reservation;

determining if the user has failed to timely complete the first ticketing Web page form; and at least partly in response to a determination that the user has failed to timely complete the first ticketing Web page form, causing a reservation expiration notice to be presented to the user by the first client system;

receiving a ticket request transmitted from a second client system associated with a second user;

transmitting an instruction to the second client system, the instruction indicating that the second client system is to periodically transmit messages to the computer system during a first time period;

determining if the second client system is transmitting messages at greater than a first frequency during the first period; and based at least in part on determining that the second client system is transmitting messages at greater than a first frequency during the first time period, causing the request to go unfulfilled.

8. The system as defined in claim 1, wherein the first client system is a cellular phone.

9. A method of managing ticketing interfaces, comprising:

providing over a network, by a computer system including at least one computing device, a first ticketing form for display on a first client system to a user;

determining by the computing system if the user has a ticket in a reserved state by accessing information stored in computer readable memory;

adjusting by the computing system a first value related to an amount of time the user has to complete the first ticketing form before expiration of the ticket reservation, wherein the first value is adjusted based in part on a first computer system load;

using the adjusted first value, providing an indication, including a time value substantially corresponding to the adjusted first value, to be displayed to the user via the first client system as to the amount of time the user to complete the first ticketing form before expiration of the ticket reservation;

determining by the computer system if the user has failed to timely complete the first ticketing form;

at least partly in response to a determination by the computer system that the user has failed to timely complete the first ticketing form, causing a reservation expiration notice to be presented to the user by the first client system.

10. The method as defined in claim 9, the method further comprising:

providing for display to the user a second ticketing form;

retrieving from computer readable memory a second value related to an amount of time the user has to complete the second ticketing form before expiration of the ticket reservation, wherein the second value, related to the amount of time the user has to complete the second ticketing form before expiration of the ticket reservation, is different than the first value, related to the amount of time the user has to complete the first ticketing form before expiration of the ticket reservation; and providing an indication to the user as to the amount of time the user to complete the second ticketing form before expiration of the ticket reservation.

11. The method as defined in claim 9, wherein the first ticketing form is a ticket delivery page configured to enable the user to specify how the ticket is to be delivered to the user.

12. The method as defined in claim 9, wherein the first ticketing form is an account information page.

13. The method as defined in claim 9, wherein the first ticketing form comprises a Web page.

14. The method as defined in claim 9, wherein the first ticketing form is a payment page configured to enable the user to specify a form of payment to be used.

15. The method as defined in claim 9, wherein the reservation expiration notice is provided for display on first client system.

16. A method of managing ticketing interfaces, comprising:

providing over a network, by a computer system including at least one computing device, a first ticketing form for display on a first client system to a user;

determining by the computing system if the user has a ticket in a reserved state by accessing information stored in computer readable memory;

adjusting by the computing system a first value related to an amount of time the user has to complete the first ticketing form before expiration of the ticket reservation, wherein the first value is adjusted based at least in part on system load;

using the first adjusted value, providing an indication, including a time value substantially corresponding to the adjusted first value, to be displayed to the user via the first client system as to the amount of time the user to complete the first ticketing form before expiration of the ticket reservation;

determining by the computer system if the user has failed to timely complete the first ticketing form;

at least partly in response to a determination by the computer system that the user has failed to timely complete the first ticketing form, causing a reservation expiration notice to be presented to the user by the first client system;

receiving at the computer system a ticket request transmitted from a second client system associated with a second user;

transmitting an instruction from the computer system to the second client system, the instruction indicating that the second client system is to periodically transmit messages to the computer system during a first time period;

determining if the second client system is transmitting messages at greater than a first frequency during the first period; and based at least in part on determining that the second client system is transmitting messages at greater than a first frequency during the first time period, causing the request to go unfulfilled.

17. Non-transitory memory storing programmatic instructions, that when executed by a computing system, cause the computing system to perform operations, comprising:

providing over a network a first ticketing form for display on a first client system to a user;

determining if the user has a ticket in a reserved state by accessing information stored in computer readable memory;

adjusting a first value related to an amount of time the user has to complete the first ticketing form before expiration of the ticket reservation, wherein the first value is adjusted based in part on a first computer system load;

using the adjusted first value, providing an indication, including a time value substantially corresponding to the adjusted first value, to be displayed to the user via the first client system as to the amount of time the user to complete the first ticketing form before expiration of the ticket reservation;

determining if the user has failed to timely complete the first ticketing form; and at least partly in response to a determination that the user has failed to timely complete the first ticketing form, causing a reservation expiration notice to be presented to the user by the first client system.

18. The non-transitory memory as defined in claim 17, the operations further comprising:

providing for display to the user a second ticketing form;

retrieving from computer readable memory a second value related to an amount of time the user has to complete the second ticketing form before expiration of the ticket reservation, wherein the second value, related to the amount of time the user has to complete the second ticketing form before expiration of the ticket reservation, is different than the first value, related to the amount of time the user has to complete the first ticketing form before expiration of the ticket reservation; and providing an indication to the user as to the amount of time the user to complete the second ticketing form before expiration of the ticket reservation.

19. The non-transitory memory as defined in claim 17, wherein the first ticketing form is a ticket delivery page configured to enable the user to specify how the ticket is to be delivered to the user.

20. The non-transitory memory as defined in claim 17 wherein the first ticketing form is an account information page.

21. The non-transitory memory as defined in claim 17, wherein the first ticketing form is a payment page configured to enable the user to specify a form of payment to be used.

22. The non-transitory memory as defined in claim 17, wherein the first ticketing form comprises a Web page.

23. The non-transitory memory as defined in claim 17, wherein the reservation expiration notice is a provided for display on the first client system.

24. Non-transitory memory storing programmatic instructions, that when executed by a computing system, cause the computing system to perform operations, comprising:

providing over a network a first ticketing form for display on a first client system to a user;

determining if the user has a ticket in a reserved state by accessing information stored in computer readable memory;

adjusting a first value related to an amount of time the user has to complete the first ticketing form before expiration of the ticket reservation, wherein the first value is adjusted based at least in part on system load;

using the adjusted first value, providing an indication, including a time value substantially corresponding to the adjusted first value, to be displayed to the user via the first client system as to the amount of time the user to complete the first ticketing form before expiration of the ticket reservation;

determining if the user has failed to timely complete the first ticketing form; and at least partly in response to a determination that the user has failed to timely complete the first ticketing form, causing a reservation expiration notice to be presented to the user by the first client system;

receiving a ticket request transmitted from a second client system associated with a second user;

transmitting an instruction to the second client system, the instruction indicating that the second client system is to periodically transmit messages to the computer system during a first time period;

determining if the second client system is transmitting messages at greater than a first frequency during the first period; and based at least in part on determining that the second client system is transmitting messages at greater than a first frequency during the first time period, causing the request to go unfulfilled.

* * * * *